US012620674B2

(12) United States Patent
Hong et al.

(10) Patent No.: US 12,620,674 B2
(45) Date of Patent: May 5, 2026

(54) SEPARATOR, AND SECONDARY BATTERY, BATTERY MODULE, BATTERY PACK, AND APPARATUS INCLUDING THE SAME

(71) Applicant: CONTEMPORARY AMPEREX TECHNOLOGY (HONG KONG) LIMITED, Hong Kong (CN)

(72) Inventors: Haiyi Hong, Ningde (CN); Jianrui Yang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 99 days.

(21) Appl. No.: 18/387,076

(22) Filed: Nov. 6, 2023

(65) Prior Publication Data

US 2024/0079725 A1 Mar. 7, 2024

Related U.S. Application Data

(63) Continuation of application No. PCT/CN2021/143124, filed on Dec. 30, 2021.

(51) Int. Cl.
*H01M 50/446* (2021.01)
*H01M 50/42* (2021.01)
(Continued)

(52) U.S. Cl.
CPC ......... *H01M 50/446* (2021.01); *H01M 50/42* (2021.01); *H01M 50/423* (2021.01);
(Continued)

(58) Field of Classification Search
CPC .. H01M 50/446; H01M 50/42; H01M 50/423; H01M 50/426; H01M 50/434;
(Continued)

(56) References Cited

U.S. PATENT DOCUMENTS

2014/0186680 A1* 7/2014 Kim ...................... H01M 50/42 429/144
2017/0149039 A1* 5/2017 Shon ................... H01M 50/491
(Continued)

FOREIGN PATENT DOCUMENTS

CN 104393220 A 3/2015
CN 108461692 A 8/2018
(Continued)

OTHER PUBLICATIONS

Machine translation of Chinese Patent Document 109148798A, published Jan. 4, 2019. (Year: 2019).*
(Continued)

*Primary Examiner* — Miriam Stagg
*Assistant Examiner* — Lilia Nedialkova
(74) *Attorney, Agent, or Firm* — XSENSUS LLP

(57) ABSTRACT

The present application provides a separator, which may include a substrate and a coating provided on at least one surface of the substrate, the coating including inorganic particles, first and second organic particles, organic-inorganic hybrid composite compound particles, and a first binder; where the first organic particles and the second organic particles may be embedded in the inorganic particles and the organic-inorganic hybrid composite compound particles and form bulges on a surface of the coating; the first organic particles and the second organic particles each may be independently one or more polymers containing one or more groups selected from: halogen, a phenyl group, an epoxy group, a cyano group, an ester group, an amide group, a hydroxyl group, a carboxyl group, a sulfonyl ester group, and a pyrrolidone group; and the first binder may include one or more linear copolymers containing a hydroxyl group and a carboxylate moiety.

18 Claims, 4 Drawing Sheets

(51) Int. Cl.
*H01M 50/423* (2021.01)
*H01M 50/426* (2021.01)
*H01M 50/434* (2021.01)
*H01M 50/449* (2021.01)

(52) U.S. Cl.
CPC ....... *H01M 50/426* (2021.01); *H01M 50/434* (2021.01); *H01M 50/449* (2021.01)

(58) Field of Classification Search
CPC ............. H01M 50/449; H01M 50/409; H01M 50/443; Y02E 60/10
See application file for complete search history.

(56) References Cited

U.S. PATENT DOCUMENTS

| | | | | |
|---|---|---|---|---|
| 2018/0277909 | A1* | 9/2018 | Harada | H01M 10/056 |
| 2019/0140239 | A1* | 5/2019 | Mizuno | B29D 7/01 |
| 2019/0237734 | A1 | 8/2019 | Lee et al. | |
| 2019/0355953 | A1 | 11/2019 | Nam et al. | |
| 2020/0220136 | A1* | 7/2020 | Wang | H01M 50/446 |
| 2021/0184311 | A1* | 6/2021 | Lefebvre | H01M 8/1048 |
| 2022/0285788 | A1* | 9/2022 | Kim | H01M 50/446 |

FOREIGN PATENT DOCUMENTS

| | | | | |
|---|---|---|---|---|
| CN | 109148798 | A * | 1/2019 | H01M 50/403 |
| CN | 109461873 | A | 3/2019 | |
| CN | 113851787 | A | 12/2021 | |

OTHER PUBLICATIONS

Park, C. et al., "Prussian Blue Nanolayer-Embedded Separator for Selective Segregation of Nickel Dissolution in High Nickel Chathodes", Nano Letters, 22, pp. 1804-1811, published Dec. 13, 2021. (Year: 2021).*
International Search Report and Written Opinion mailed on Oct. 10, 2022, received for PCT Application PCT/CN2021/143124, filed on Dec. 30, 2021, 13 pages including English Translation.
Extended European Search Report issued Oct. 21, 2024 in European Patent Application No. 21964984.5.

* cited by examiner

SEPARATOR, AND SECONDARY BATTERY, BATTERY MODULE, BATTERY PACK, AND APPARATUS INCLUDING THE SAME

CROSS-REFERENCE TO RELATED APPLICATION

The present application is a continuation of International Application No. PCT/CN2021/143124, filed on Dec. 30, 2021, which is incorporated herein by reference in its entirety.

TECHNICAL FIELD

The present application relates to the field of lithium battery technologies, and in particular, to a separator, a preparation method thereof, and a secondary battery, battery module, battery pack, and apparatus including the same.

BACKGROUND

Lithium-ion secondary batteries are widely applied to a variety of electronic products and vehicles due to their various advantages, and accompany people day and night. Therefore, the safety issue of the lithium-ion secondary batteries has become one of the most important topics in the industry.

A separator is an important part to ensure the safety of a battery. If the separator is damaged (such as high temperature shrinkage, melting, oxidation and/or breakage), it may cause a short circuit in an interior of the battery, resulting in a safety incident. In order to improve the safety of a lithium-ion battery, many technical solutions have been proposed in the prior art. However, so far, there is no solution that could take into account performance in various aspects of a battery while improving safety.

Therefore, at present, how to obtain a secondary battery having good safety performance and taking into account other performance is still a challenge in this field.

SUMMARY

The present application is made in view of the foregoing problem, the objective is to provide a separator with good safety performance, low impedance, and good infiltration performance of an electrolytic solution, which could improve cycle performance and safety of a battery.

In order to achieve the foregoing objective, the present application provides a separator, and a secondary battery, battery module, battery pack, and apparatus including the separator.

In a first aspect of the present application, a separator is provided, including: a substrate, and a coating provided on at least one surface of the substrate, the coating including inorganic particles, first organic particles, second organic particles, organic-inorganic hybrid composite compound particles, and a first binder;

where:

the first organic particles and the second organic particles are embedded between the inorganic particles and the organic-inorganic hybrid composite compound particles and form bulges on a surface of the coating;

the first organic particles and the second organic particles each are independently one or more polymers containing one or more groups selected from: halogen, a phenyl group, an epoxy group, a cyano group, an ester group, an amide group, a hydroxyl group, a carboxyl group, a sulfonyl ester group, and a pyrrolidone group;

the first binder includes one or more linear copolymers containing a hydroxyl group and a carboxylate moiety; optionally, the first binder includes one or more linear copolymers containing a hydroxyl group, a carboxylate moiety, an amide group, and an epoxy group; optionally, the carboxylate moiety is a lithium carboxylate moiety; and the organic-inorganic hybrid composite compound contains metal atoms and/or metal cations, and organic ligands, and basic units constituting the organic-inorganic hybrid composite compound are periodically assembled in at least one spatial direction.

In any embodiment, in the separator of the present application, the organic-inorganic hybrid composite compound is constituted by periodically assembling basic units shown in formula I in at least one spatial direction:

$$L_xM_y{\bullet}A_z \quad \text{formula I}$$

in formula I,

M is a cation of one or more metals selected from: Zn, Co, Cu, Fe, Cd, Mn, Ag, Rh, Ru, Be, Mg, Al, Sc, Cr, Ni, Y, Ti, Zr, Hf, Li, Na, K, In, Ca, Sr, Pb, a lanthanide series metal, and an actinide series metal, and y is a value in a range of 0.1 to 10; optionally, M is a cation of one or more metals selected from: Zn, Co, Cu, Fe, Cd, Mn, Mg, Cr, Ni, Y, Na, and K; more optionally, M is a cation of one or more metals selected from Co, Fe, Mn and Ni;

when M is a cation of two or more metals, y represents the number of all metal cations in a basic unit M shown in a single formula I;

A is an atom or a cation of one or more metal elements selected from: Li, Na, K, Rb, Cs, Be, Sr, Zn, Al, Mg and Ca, and/or one or more molecules selected from: Hz, $O_2$, $H_2O$, $CO_2$, $NH_3$, $CH_4$, methyl formate, ethyl acetate, and propylene carbonate, and z is a value from 0 to 100, optionally, a value from 1.8 to 2; optionally, A is an atom or a cation of one or more metal elements and/or one or more molecules selected from: Li, Na, K, Zn, $H_2O$, $CO_2$, $NH_3$, $CH_4$, and methyl formate; more optionally, A is an atom or cation of one or more metal elements selected from: Li, Na and K; and L is one or more ligands selected from: a cyano group, $CN^-$, a thiocyanate group, $SCN^-$, nitrile and its salts, acid radical, ester and anhydride; optionally, L is one or more ligands selected from: a cyano group, a thiocyanate group or nitrile; more optionally, L is a cyano group; and/or the nitrile is selected from one or more of: straight-chain or branched $C_2$-$C_{12}$ alkane dinitrile, straight-chain or branched $C_3$-$C_{12}$ alkane trinitrile, straight-chain or branched $C_4$-$C_{12}$ alkane tetranitrile, straight-chain or branched $C_2$-$C_{12}$ olefin dinitrile, straight-chain or branched $C_3$-$C_{12}$ olefin trinitrile, straight-chain or branched $C_4$-$C_{12}$ olefin tetranitrile, straight-chain or branched $C_2$-$C_{12}$ alkyne dinitrile, straight-chain or branched $C_3$-$C_{12}$ alkyne trinitrile, and straight-chain or branched $C_4$-$C_{12}$ alkyne tetranitrile, one or more hydrogen atoms in the nitrile are arbitrarily substituted with one or more substituent groups selected from the following groups: a cyano group, a nitro group, an amino group, an aldehyde group, a carboxyl group, halogen, a $C_1$-$C_8$ alkyl group, a $C_1$-$C_8$ hydroxyalkyl group, a $C_1$-$C_8$ alkoxy group, a $C_2$-$C_8$ alkenyl group, a $C_2$-$C_8$ alkynyl group, a $C_3$-$C_{16}$ naphthenic base, a $C_6$-$C_{20}$ aryl group, a $C_6$-$C_{20}$ heteroaryl group, or any combination thereof; x is a value from 1 to 50, optionally, a value from 3 to 6.5;

optionally, the organic-inorganic hybrid composite compound is $(CN)_6[FeMn]K_2$, $(CN)_{5.7}[Co_{0.95}Fe]K_{1.8}$, or $(CN)_{5.98}[Fe_{0.99}Mn]Na_{1.99}$.

Therefore, a separator of the present application has good heat resistance, is beneficial to infiltration of an electrolytic solution and ion transmission, and has low resistance.

In any embodiment, in the separator of the present application, number-average particle sizes of the organic particles, the first organic particles, the second organic particles and the organic-inorganic hybrid composite compound particles are respectively defined as $R_I$, $R_{O1}$, $R_{O2}$ and $R_{O-I}$, which satisfy 0.2 μm≤min{$R_{O1}$, $R_{O2}$}−max{$R_I$, $R_{O-I}$}≤10 μm; optionally, 1 μm≤min{$R_{O1}$, $R_{O2}$}−max {$R_I$, $R_{O-I}$}≤10 μm; more optionally, 1.5 μm≤min{$R_{O1}$, $R_{O2}$}−<7 μm. By making the number-average particle sizes of various particles in the separator satisfy the above relationship, the safety performance and cycle performance of a battery cell could be improved.

In any embodiment, in the separator of the present application, Dv50 of the first organic particles is 5 μm to 30 μm, optionally, 8 μm to 18 μm; and/or Dv50 of the second organic particles is 2 μm to 11.5 μm, optionally, 3.2 μm to 8.5 μm; and/or Dv50 of the organic-inorganic hybrid composite compound particles is 0.01 μm to 3 μm, optionally, 0.1 μm to 2 μm. By controlling Dv50 of each particle within the above range, a separator with the above relationship could be obtained, and the separator has good heat resistance, and good absorption of an electrolytic solution and ion conduction capabilities.

In any embodiment, in the separator of the present application, the first organic particles are particles of a homopolymer or copolymer containing one or more substituent groups selected from halogen, a phenyl group, an epoxy group, a cyano group, an ester group, and an amide group; optionally, the first organic particles are particles of a homopolymer or copolymer containing a halogen substituent group; and/or the second organic particles are particles of a homopolymer or copolymer containing one or more substituent groups selected from a phenyl group, an epoxy group, a cyano group, an ester group, a hydroxyl group, a carboxyl group, a sulfonyl ester group, and a pyrrolidone group; optionally, the second organic particles are particles of a homopolymer or copolymer containing a phenyl substituent group and/or an ester substituent group. The above first and second organic particles can improve the ion conduction capability and are bonded properly with an electrode sheet, which improves a shaping capability and stress release in the cycle process, and improves the safety and kinetic performance of the battery cell.

In any embodiment, in the separator of the present application, a specific surface area of the organic-inorganic hybrid composite compound particles is 1 $m^2$/g to 50 $m^2$/g, optionally, 2 $m^2$/g to 30 $m^2$/g, more optionally, 4.5 $m^2$/g to 28 $m^2$/g. When the specific surface area is in the given range, the number of functional groups exposed on the surfaces of the particles is conducive to proper chemical reactions with the first binder and the like.

In any embodiment, in the separator of the present application, the linear copolymer(s) is a polymerization product containing the following types of monomers:

(1) a first type of monomer, the first type of monomer is selected from at least one of: acrylic acid, methacrylic acid, methyl methacrylate, tert-butyl methacrylate, isobornyl methacrylate, methylolacrylamide, acrylamide, styrene, and acrylonitrile; optionally, the first type of monomer is selected from at least one of: styrene, (2) a second type of monomer, the second type of monomer is selected from at least one of: ethyl acrylate, n-butyl acrylate, isobutyl acrylate, tert-butyl acrylate, 2-ethylhexyl acrylate, n-octyl acrylate, decyl acrylate, cyclohexyl acrylate, ethyl methacrylate, n-butyl methacrylate, isobutyl methacrylate, 2-ethylhexyl methacrylate, lauryl methacrylate, n-hexyl methacrylate, tridecyl methacrylate, octadecyl methacrylate, cyclohexyl methacrylate, benzyl methacrylate, ethyleneurea ethyl methacrylate, dicyclopentene ethoxy methacrylate, tetrahydrofuryl methacrylate, trifluoroethyl methacrylate, ethyleneurea ethyl methacrylate, propylene methacrylate, dicyclopentene ethoxy methacrylate, tetrahydrofuryl methacrylate, and trifluoroethyl methacrylate; optionally, the second type of monomer is selected from at least one of: n-butyl acrylate, and n-hexyl methacrylate;

(3) a third type of monomer, the third type of monomer is selected from at least one of: 2-hydroxyethyl acrylate, 2-hydroxypropyl acrylate, 2-hydroxyethyl methacrylate, 2-hydroxypropyl methacrylate, glycidyl acrylate, glycidyl methacrylate, dimethylamino ethyl methacrylate, diethylaminoethyl methacrylate, vinyltrimethoxysilane, vinyltriethoxysilane, vinyltriisopropoxysilane, γ-methacryloxypropyltrimethoxysilane, N-methylolacrylamide, N-butoxymethyl(methyl)acrylamide, diacetone acrylamide (DAAM), acetoacetoxy ethyl methacrylate (AAEM), divinylbenzene, and epoxy resin with an epoxy value of 0.35~0.50; optionally, the third type of monomer is selected from at least one of: 2-hydroxyethyl methacrylate, epoxy resin with an epoxy value of 0.35~0.50, and divinylbenzene; and (4) a fourth type of monomer, the fourth type of monomer is selected from at least one of: polyvinyl alcohol, polypropylene alcohol, polypropylene glycol, polyethylene glycol, and polyvinyl acid alcohol, optionally, polyvinyl alcohol, where an alcoholysis degree of the fourth monomer is greater than or equal to 85%, and an average degree of polymerization is 400 to 2000; optionally, an alcoholysis degree is greater than or equal to 88%, and an average degree of polymerization is 500 to 1600.

In any embodiment, in the separator of the present application, after polymerizing the first type of monomer, the second type of monomer, the third type of monomer and the fourth type of monomer, a pH regulator is added to adjust pH to 5-7, and the pH regulator is selected from at least one of: lithium hydroxide, calcium hydroxide, sodium hydroxide and ammonia water; optionally, the pH regulator is lithium hydroxide.

In any embodiment, in the separator of the present application, the first type of monomer accounts for 60 wt % to 85 wt %, optionally, 70 wt % to 80 wt %; and/or the second type of monomer accounts for 1 wt % to 10 wt %, optionally, 5 wt % to 10 wt %; and/or the third type of monomer accounts for 1 wt % to 10 wt %, optionally, 1 wt % to 5 wt %; and/or the fourth type of monomer accounts for 1 wt % to 20 wt %, optionally, 10 wt % to 15 wt %, calculated based on a total weight of all monomers contained in the linear copolymer(s).

In any embodiment, in the separator of the present application, the linear copolymer(s) is a polymer selected from:

A. a 30% styrene-15% methacrylic acid-10% acrylamide-15% acrylic acid-5% acrylonitrile-10% n-butyl acrylate-2% 2-hydroxyethyl methacrylate-1% E44 epoxy resin-12% polyvinyl alcohol copolymer;
B. a 30% styrene-15% methacrylic acid-10% acrylamide-15% acrylic acid-5% acrylonitrile-10% n-butyl acrylate-2% 2-hydroxyethyl methacrylate-1% E44 epoxy resin-12% polyvinyl alcohol copolymer;
C. a 30% styrene-15% methacrylic acid-10% acrylamide-15% acrylic acid-5% acrylonitrile-10% n-butyl acrylate-2% 2-hydroxyethyl methacrylate-1% E44 epoxy resin-12% polyvinyl alcohol copolymer;
D. a 35% styrene-15% methacrylic acid-10% acrylamide-15% acrylic acid-5% acrylonitrile-5% n-butyl acrylate-2% 2-hydroxyethyl methacrylate-1% E44 epoxy resin-12% polyvinyl alcohol copolymer;
E. a 30% styrene-15% methacrylic acid-10% acrylamide-15% acrylic acid-5% acrylonitrile-10% n-butyl acrylate-3% 2-hydroxyethyl methacrylate-12% polyvinyl alcohol copolymer;
F. a 30% styrene-15% methacrylic acid-15% acrylamide-15% acrylic acid-5% acrylonitrile-5% n-butyl acrylate-2% 2-hydroxyethyl methacrylate-1% E44 epoxy resin-12% polyvinyl alcohol copolymer;
G. a 40% styrene-10% acrylamide-15% acrylic acid-10% n-butyl acrylate-5% n-hexyl methacrylate-2% 2-hydroxyethyl methacrylate-1% E44 epoxy resin-12% polyvinyl alcohol copolymer; and
H. a 35% styrene-15% methacrylic acid-10% acrylamide-15% acrylic acid-5% acrylonitrile-10% n-butyl acrylate-2% divinylbenzene-1% E44 epoxy resin-12% polyvinyl alcohol copolymer;

where an average epoxy value of the E44 epoxy resin is 0.44, an alcoholysis degree of the polyvinyl alcohol is 88% and a degree of polymerization of the polyvinyl alcohol is 1000, and the percentage is a weight percentage of a monomer, calculated based on a total weight of all monomers.

In any embodiment, in the separator of the present application, a weight-average molecular weight of the linear copolymer(s) is $1\times10^3$ g/mol to $200\times10^3$ g/mol, optionally, $2\times10^3$ g/mol to $80\times10^3$ g/mol.

The above linear copolymer(s) enables the first binder to have good wettability on the substrate, which improves thermal shrinkage performance of the separator, thereby improving the safety performance and kinetic performance of the battery cell.

In any embodiment, in the separator of the present application, the first organic particles are at least one selected from: a homopolymer or copolymer of fluorine-containing alkenyl monomer units, a homopolymer or copolymer of olefin monomer units, a homopolymer or copolymer of unsaturated nitrile monomer units, a homopolymer or copolymer of alkylene oxide monomer units, a bipolymer, homopolymer or copolymer of monosaccharide monomer units, and modified compounds of the above homopolymers or copolymers; optionally, the first organic particles are at least one selected from: polyperfluorinated ethylene, polyvinylidene fluoride, polyvinylidene fluoride-co-hexafluoropropylene, polyvinylidene fluoride-co-trichloroethylene, polystyrene-co-methyl methacrylate, polystyrene-co-butyl acrylate, polymethyl methacrylate, polyacrylonitrile, polyvinyl acetate, polyethylene-co-vinyl acetate, polyimide, polyethylene oxide, cellulose acetate, cellulose acetate butyrate, cellulose acetate propionate, cyanoethyl pullulan, cyanoethyl polyvinyl alcohol, cyanoethyl cellulose, and cyanoethyl sucrose; more optionally, the first organic particles are polyvinylidene fluoride-co-hexafluoropropylene, polystyrene-co-butyl acrylate, polyperfluorinated ethylene, polyvinylidene fluoride, or polyvinylidene fluoride-co-trichloroethylene; still more optionally, the first organic particles are polyvinylidene fluoride-co-hexafluoropropylene. The above first organic particles are bonded properly with the electrode sheet, which improves the shaping capability and stress release in the cycle process, and improves the safety and kinetic performance of the battery cell.

In any embodiment, in the separator of the present application, the second organic particles are at least one selected from: a homopolymer or copolymer of acrylate monomer units, a homopolymer or copolymer of acrylic acid monomer units, a homopolymer or copolymer of unsaturated nitrile monomer units, a homopolymer or copolymer of ethylenic monomer units, a homopolymer or copolymer of styrene monomer units, a homopolymer or copolymer of epoxy monomer units, a polyurethane compound, a rubber compound, a bipolymer, homopolymer or copolymer of monosaccharide monomer units, and modified compounds of the above homopolymers or copolymers; optionally, the second organic particles are selected from at least one of: polymethyl methacrylate, polyacrylonitrile, polyvinylpyrrolidone, polyvinyl acetate, polyethylene-co-vinyl acetate, polystyrene-co-methyl methacrylate, polystyrene-co-butyl acrylate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, an acrylonitrile-styrene-butadiene copolymer, a styrene-butyl acrylate-isooctyl acrylate copolymer, and polyimide; more optionally, the second organic particles are a styrene-butyl acrylate-isooctyl acrylate copolymer. The above second organic particles can maintain proper swelling and improve the ion conduction capability, and are bonded properly with the electrode sheet, which improves the shaping capability and stress release in the cycle process, and improves the safety and kinetic performance of the battery cell.

In any embodiment, in the separator of the present application, calculated based on a total weight of the coating, a content of the inorganic particles is 0 to 44 wt %, optionally, 10 to 35 wt %; and/or a content of the organic-inorganic hybrid composite compound particles is 30 to 74 wt %, optionally, 39 to 64 wt %; and/or a content of the first binder is 2 to 8 wt %; and/or a total content of the first organic particles and the second organic particles is 16 to 31 wt %.

In any embodiment, in the separator of the present application, a weight ratio of the first organic particles to the second organic particles is 1:2 to 6:1, optionally, 2:1 to 5:1, more optionally, 2.5:1 to 3.5:1, still more optionally, 2.8:1 to 3.3:1.

The contents of the various particles are controlled within the above ranges, which could improve the heat resistance of the separator and improve the safety performance of a secondary battery.

In any embodiment, in the separator of the present application, viscosity of the first binder is 150-400 mPa·s, optionally, 200-300 mPa·s. When the viscosity of the first binder is controlled within the above range, the first binder properly infiltrates the substrate, which prevents the migration of the first binder to pores of the separator, reduces the risk of excessive increase in the air permeability of the separator, and improves the heat resistance and kinetic performance of the separator.

In any embodiment, in the separator of the present application, a ratio of a total weight of the first organic particles and the second organic particles to a total weight of the inorganic particles and the organic-inorganic hybrid composite compound particles is 1:5 to 1:2. This ratio helps to balance the bonding and heat resistance of the separator.

In a second aspect of the present application, a secondary battery is provided, including the separator in the first aspect. The secondary battery of the present application has a high capacity retention rate at room temperature and high temperature, and good safety performance.

In a third aspect of the present application, a battery module is provided, including the secondary battery in the second aspect.

In a fourth aspect of the present application, a battery pack is provided, including the battery module in the third aspect.

In a fifth aspect of the present application, a power consumption apparatus is provided, including at least one selected from the secondary battery in the second aspect of the present application, the battery module in the third aspect of the present application, or the battery pack in the fourth aspect of the present application.

The separator of the present application has good safety performance, low impedance, good infiltration performance of an electrolytic solution, and could improve cycle performance and safety of a battery.

DESCRIPTION OF REFERENCE SIGNS

Figure 1:
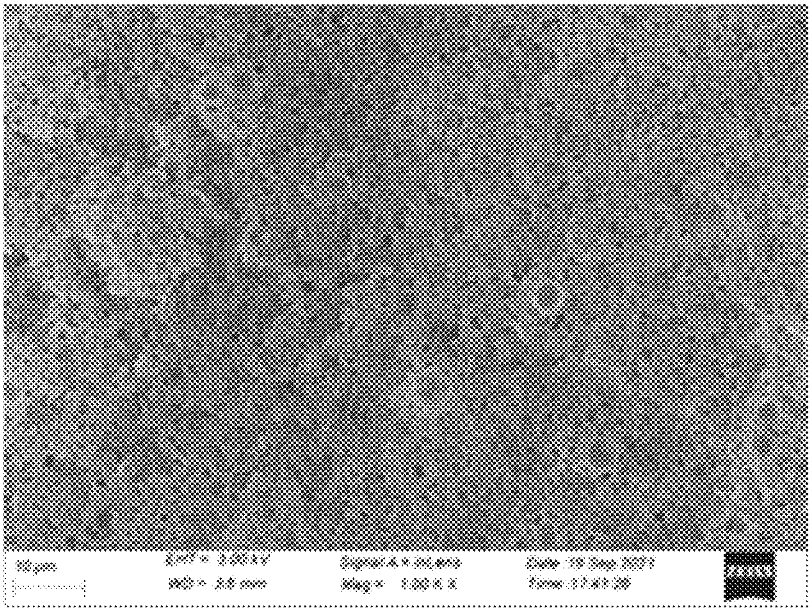
FIG. 1 is a scanning electron microscope picture of a surface of a coating of a separator of the present application.

1 battery pack; 2 upper box body; 3 lower box body; 4 battery module; 5 secondary battery; 51 housing; 52 electrode assembly; 53 top cover assembly.

DESCRIPTION OF EMBODIMENTS

Embodiments that specifically disclose a separator, a secondary battery, a battery module, a battery pack and an electrical apparatus of the present application will be described below in detail with reference to the accompanying drawings as appropriate. However, unnecessarily detailed descriptions may be omitted in some cases. For example, detailed description for a well-known matter and repeated description for a practically identical structures are omitted. This is done to avoid unnecessarily redundant descriptions for ease of understanding by persons skilled in the art. In addition, the drawings and the following description are provided for persons skilled in the art to fully appreciate the present application, and are not intended to limit the subject matters described in the claims.

A "range" disclosed herein is defined in the form of a lower limit and an upper limit. A given range is defined by selecting a lower limit and an upper limit, and the selected lower limit and upper limit define a boundary of a particular range. The range defined in this manner may or may not include end values, and may be combined arbitrarily, that is, any lower limit may be combined with any upper limit to form a range. For example, if ranges of 60-120 and 80-110 are listed for a particular parameter, it is understood that ranges of 60-110 and 80-120 are also contemplated. In addition, if the minimum range values listed are 1 and 2, and the maximum range values listed are 3, 4 and 5, all the following ranges are contemplated: 1-3, 1-4, 1-5, 2-3, 2-4, and 2-5. In the present application, unless otherwise specified, a numerical range "a-b" represents an abbreviated representation of any combination of real numbers between a and b, where both a and b are real numbers. For example, a numerical range "0-5" means that all real numbers between "0-5" have been listed herein, and "0-5" is just an abbreviated representation of a combination of these numerical values. In addition, when a certain parameter is expressed as an integer ≥2, it is equivalent to disclosing that the parameter is, for example, an integer of 2, 3, 4, 5, 6, 7, 8, 9, 10, 11, 12, or the like.

Unless otherwise specified, all embodiments and optional embodiments of the present application may be combined with each other to form a new technical solution.

Unless otherwise specified, all technical features and optional technical features of the present application may be combined with each other to form a new technical solution.

Unless otherwise specified, all steps of the present application may be performed sequentially or randomly, but preferably, performed sequentially. For example, a method includes steps (a) and (b), which means that the method may include steps (a) and (b) performed sequentially, or steps (b) and (a) performed sequentially. For example, the method mentioned may further include step (c), which means that step (c) may be added to the method in any order, for example, the method may include steps (a), (b) and (c), steps (a), (c) and (b), steps (c), (a) and (b), or the like.

Unless otherwise specified, "comprising" and "containing" mentioned in the present application are open-ended or closed-ended. For example, the "comprising" and "containing" may mean that other components that are not listed may further be comprised or contained, or only listed components may be comprised or contained.

Unless otherwise specified, in the present application, the term "or" is inclusive. For example, the phrase "A or B" means "A, B or both A and B". More particularly, a condition "A or B" is satisfied by any one of the following: A is true (or present) and B is false (or not present); A is false (or not present) and B is true (or present); or both A and B are true (or present).

Lithium-ion secondary batteries are widely applied to a variety of electronic products and vehicles due to their various advantages, and accompany people day and night. Therefore, the safety issue of the lithium-ion secondary batteries has become one of the most important topics in the industry.

A separator is an important part to ensure the safety of a battery. If the separator is damaged (such as high temperature shrinkage, melting, oxidation and/or breakage), it may cause a short circuit in an interior of the battery, resulting in a safety incident. In order to improve the safety of a lithium-ion battery, many technical solutions have been proposed in the prior art.

According to some technical solutions, a separator is obtained by forming an inorganic particle coating on a substrate, so as to inhibit thermal shrinkage of the substrate and prevent the growth of dendrites. However, such a separator has several disadvantages: (1) it may be fractured due to the stress generated in the assembly process such as winding of a battery; (2) the adhesive between the coating and the substrate is weak, and heat resistance of the separator is deteriorated; (3) inorganic particles are usually poor conductors of ions, which affects the kinetic performance of a battery cell; and (4) the adhesion between the separator and an electrode sheet is poor.

According to some other technical solutions, an appropriate amount of organic particles (such as primary or secondary particles of a fluoropolymer) are coated on an inorganic particle coating to prepare a separator, so as to improve the bonding performance; However, this will obviously increase the thickness of the separator, and correspondingly reduce energy density of a battery cell.

According to still some technical solutions, organic particles (such as fluoropolymer particles) and inorganic particles are coated together on a substrate to prepare a separator. Although this can reduce the thickness of the separator, this type of separator may cause safety issues due to pore blockage, uneven particle distribution, a failure to produce a good interface, reduction of compactness of the coating, or the like.

In addition, in a case of coating with organic particles, in order to ensure the bonding between an electrode sheet and the separator during the full life cycle of a battery, an amount of organic particles added is relatively great, and the organic particles swell when encountering an electrolytic solution, thereby consuming the electrolytic solution and deteriorating the electrical performance of a battery cell.

Therefore, at present, how to make a battery have good comprehensive performance, such as safety performance and cycle performance, is a challenge for battery design in the field.

In order to solve the above problem, the present application provides a separator, a secondary battery, a battery module, a battery pack, and a power consumption apparatus.

Separator

In a first aspect of the present application, a separator is provided, including:

- a substrate, and
- a coating provided on at least one surface of the substrate, the coating including inorganic particles, first organic particles, second organic particles, organic-inorganic hybrid composite compound particles, and a first binder;

where:

- the first organic particles and the second organic particles are embedded between the inorganic particles and the organic-inorganic hybrid composite compound particles and form bulges on a surface of the coating;
- the first organic particles and the second organic particles each are independently one or more polymers containing one or more groups selected from: halogen, a phenyl group, an epoxy group, a cyano group, an ester group, an amide group, a hydroxyl group, a carboxyl group, a sulfonyl ester group, and a pyrrolidone group;
- the first binder includes one or more linear copolymers containing a hydroxyl group and a carboxylate moiety;
- the organic-inorganic hybrid composite compound contains metal atoms and/or metal cations, and organic ligands, and basic units constituting the organic-inorganic hybrid composite compound are periodically assembled in at least one spatial direction.

In some embodiments, in the separator of the present application, the organic-inorganic hybrid composite compound is constituted by periodically assembling basic units shown in formula I in at least one spatial direction:

$$L_xM_y \bullet A_z \quad \text{formula I}$$

in formula I,

- M is a cation of one or more metals selected from: Zn, Co, Cu, Fe, Cd, Mn, Ag, Rh, Ru, Be, Mg, Al, Sc, Cr, Ni, Y, Ti, Zr, Hf, Li, Na, K, In, Ca, Sr, Pb, a lanthanide series metal, and an actinide series metal, and y is a value in a range of 0.1 to 10;
- when M is a cation of two or more metals, y represents the number of all metal cations in a basic unit M shown in a single formula I;
- A is an atom or a cation of one or more metal elements selected from: Li, Na, K, Rb, Cs, Be, Sr, Zn, Al, Mg and Ca, and/or one or more molecules selected from: Hz, $O_2$, $H_2O$, $CO_2$, $NH_3$, $CH_4$, methyl formate, ethyl acetate, and propylene carbonate, and z is a value from 0 to 100;
- L is one or more ligands selected from: a cyano group, $CN^-$, a thiocyanate group, $SCN^-$, nitrile and its salts, acid radical, ester and anhydride; optionally, L is one or more ligands selected from: a cyano group, a thiocyanate group or nitrile; and/or the nitrile is selected from one or more of: straight-chain or branched $C_2$-$C_{12}$ alkane dinitrile, straight-chain or branched $C_3$-$C_{12}$ alkane trinitrile, straight-chain or branched $C_4$-$C_{12}$ alkane tetranitrile, straight-chain or branched $C_2$-$C_{12}$ olefin dinitrile, straight-chain or branched $C_3$-$C_{12}$ olefin trinitrile, straight-chain or branched $C_4$-$C_{12}$ olefin tetranitrile, straight-chain or branched $C_2$-$C_{12}$ alkyne dinitrile, straight-chain or branched $C_3$-$C_{12}$ alkyne trinitrile, and straight-chain or branched $C_4$-$C_{12}$ alkyne tetranitrile, one or more hydrogen atoms in the nitrile are arbitrarily substituted with one or more substituent groups selected from the following groups: a cyano group, a nitro group, an amino group, an aldehyde group, a carboxyl group, halogen, a $C_1$-$C_8$ alkyl group, a $C_1$-$C_8$ hydroxyalkyl group, a $C_1$-$C_8$ alkoxy group, a $C_2$-$C_8$ alkenyl group, a $C_2$-$C_8$ alkynyl group, a $C_3$-$C_{16}$ naphthenic base, a $C_6$-$C_{20}$ aryl group, a $C_6$-$C_{20}$ heteroaryl group, or any combination thereof; and x is a value from 1 to 50.

A scanning electron microscope (SEM) picture of a separator of the present application at a magnification of 1000 times is shown in FIG. 1. As shown in FIG. 1, a coating of the separator of the present application includes: an organic-inorganic hybrid material with a square-like particle size of 0.5 microns, an inorganic material of alumina with a spheroid-like particle size of 1.5 microns, first organic particles with a primary particle size of 4~5 microns, and second organic particles of 12 microns that are secondary particles formed by agglomeration of the primary particle sizes. Moreover, the first organic particles and the second organic particles are embedded in inorganic particles and form bulges on a surface of the coating.

Figure 2:
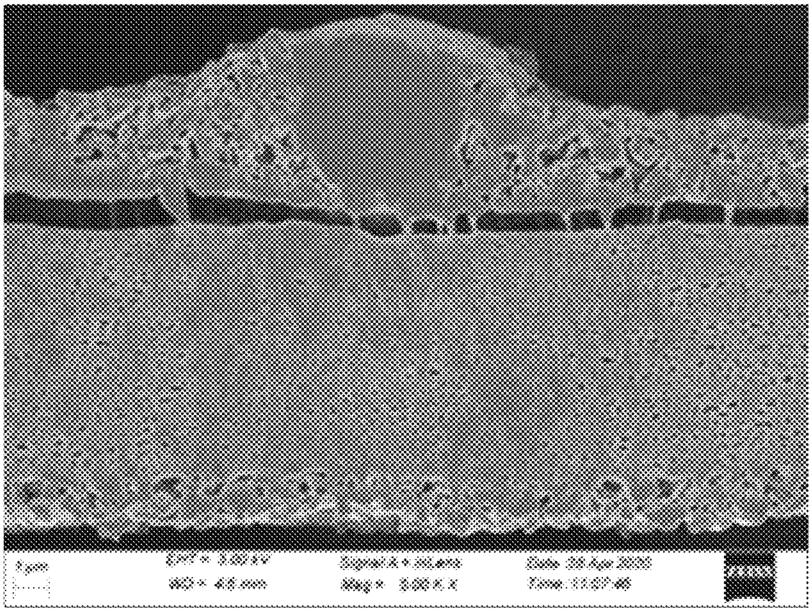
FIG. 2 is an ion-polished cross-sectional profile (CP) picture of a separator of the present application.

FIG. 2 shows an ion-polished cross-sectional profile (CP) picture of a separator of the present application at a magnification of 5000 times. In the picture, it can be seen that there is obvious connections between a coating and a base film, which are an intuitive manifestation of the chemical bonding between a first binder and the base film. Meanwhile, the coating of the separator includes first organic particles and second organic particles; the first organic particles are secondary particles composed of a plurality of primary particles, and have an irregular non-solid spherical cross-section; and the second organic particles are non-agglomerated primary particles, and have a solid spherical cross-section.

According to the present application, by coating a coating including organic-inorganic hybrid composite compound particles, first and second organic particles, inorganic particles and a first binder on at least one surface of a substrate, a separator with high temperature resistance, low impedance and easy shaping is obtained, which helps to improve structural stability, shaping, safety, and cycle performance of a battery.

Without being bound by any theory, in the separator of the present application, particle materials (such as the inorganic particles, the first organic particles, the second organic particles, and the organic-inorganic hybrid composite compound particles) are bonded, chemically bonded, and cross-linked with a first non-granular binder, so as to form a porous coating with good ion conductivity on the surface of the substrate. The non-porous part of the coating is moderately dense, thereby improving the heat resistance and resistance to puncturing by foreign matters of the separator, and improving the safety of a secondary battery. Meanwhile, compared with the prior art, the adhesion ability of the coating itself of the separator of the present application to the substrate is also improved.

It should be understood that various particle materials and the first binder contained in the separator of the present application not only have their own independent functions, but also are closely related to each other, and they work together to achieve the effect of the disclosure.

In a first aspect, it is known in the prior art that inorganic particles have a good inhibitory effect on thermal shrinkage of a substrate, which requires a relatively high content level. However, the inorganic particles would affect the kinetic performance of a battery cell due to their poor ion conduction capability. The inventor has found that by adding organic-inorganic hybrid composite compound particles to a coating while reducing the content of inorganic particles, the separator can still have good or even improved heat resistance since the former has good heat resistance (even better than the inorganic particles, such as alumina). In addition, due to its good ion conductivity and infiltration of an electrolyte, the addition of this particle material could reduce the impedance of the separator and further improve the kinetic performance of the battery cell. In addition, as described in detail below, the organic-inorganic hybrid composite compound particles can further improve the heat resistance and resistance to puncturing of the separator by chemically interacting with the first binder, thereby improving the safety.

In a second aspect, first organic particles and second organic particles are embedded between the inorganic particles and the organic-inorganic hybrid composite compound particles, which can give the separator the bonding ability, so that it is bonded with an electrode sheet to improve the shaping performance of the battery cell. Furthermore, the first and second organic particles form appropriate bulges on the surface of the coating, providing the separator with the ability to create favorable gaps: for example, on one hand, during the winding, the appropriate space is introduced with assistance of the bulges to release stress, which ensures the hardness of the battery cell (or winding fluffiness), prevents the breakage of the electrode sheet, and improves the safety; one the other hand, there is a gap between the separator and the electrode sheet, which facilitates the flow and infiltration of the electrolytic solution and improves the kinetic performance of the battery cell.

Herein, the shaping performance or the similar expression means that after the electrode sheet and the separator are integrally compounded, they can always maintain an integral state in the subsequent process until the final battery; that is, in the processing of the battery, no dislocation, loose, separation, wrinkling, lithium plating, or short connection of the electrode sheets occur on the electrode sheet and the separator.

In a third aspect, the first binder in the separator of the present application binds various particle materials and the substrate together, thus forming a porous separator that is conductive to lithium ions and whose non-porous part is moderately dense. The inventor has found that the reason of this effect is the fact that the first binder contains a linear copolymer at least having a hydroxyl group and a carboxylate moiety. The carboxylate moiety in the linear copolymer can be combined with the organic-inorganic hybrid composite compound particles, and the first and second organic particles through chemical forces (such as ionic bonds, hydrogen bonds), which improves the heat resistance of the separator and improves the kinetic performance of the battery cell. In addition, the hydroxyl group in the linear copolymer can improve the adhesion between the coating and the substrate and avoid peeling. Specifically, for the linear copolymer contained in the first binder, the hydroxyl group contained therein has hydrogen bonding with nitrogen, oxygen and fluorine atoms of the first and second organic particles and organic-inorganic hybrid composite compound particles; nitrogen and oxygen atoms contained in the linear copolymer have hydrogen bonding with the hydroxyl group or the amide group or the carboxyl group or the pyrrolidone group of the first and second organic particles and organic-inorganic hybrid composite compound particles; and the carboxylate moiety contained in the linear copolymer and the hydroxyl group or the carboxyl group of the first and second organic particles and organic-inorganic hybrid composite compound particles form ionic bonds. In short, according to the separator of the present application, by selecting appropriate particle materials and binders, the beneficial effects of heat resistance, resistance to puncturing by foreign matters, good infiltration of an electrolytic solution and low resistance are achieved. Further, such a separator is used in a battery, which could improve the safety (that is, increasing the puncturing distance) and cycle performance of the battery.

In some embodiments, optionally, the first binder includes one or more linear copolymers containing a hydroxyl group, a carboxylate moiety, an amide group, and an epoxy group. In addition to the chemical actions described above, the epoxy group and the amide group contained in the linear copolymer can further improve the safety performance of the separator. Specifically, the amide group has hydrogen bonding with nitrogen, oxygen and fluorine atoms contained in the organic-inorganic hybrid composite compound particles and the first and second organic particles; and nitrogen and oxygen atoms contained in the linear copolymer have hydrogen bonding with the hydroxyl group or the amide group or the carboxyl group or the pyrrolidone group of the first and second organic particles and organic-inorganic hybrid particles, thereby improving heat resistance of the separator. The epoxy group contained in the linear copolymer may be dehydrated and partially cross-linked with the functional groups (such as the hydroxyl group) of the organic-inorganic hybrid composite compound particles at high temperature (for example, higher than 150° C.) due to the abnormal of the battery, which inhibits the shrinkage of the separator, thereby further improving the heat resistance and reducing the risk degree. Specifically, the nucleophilic addition reaction occurs between the epoxy group and the hydroxyl group or the carboxyl group of the first and second organic particles and organic-inorganic hybrid particles.

In addition, the first linear binder contains a hydroxyl group or an amide group, and the nucleophilic substitution reaction occurs between the hydroxyl group or the amide group and the ester group or the carboxyl group or the sulfonamide group or the pyrrolidone group of the first and second organic particles and organic-inorganic hybrid particles. The nucleophilic addition reaction also occurs between the epoxy group of the first and second organic particles and organic-inorganic hybrid particles and the carboxyl group or the amide group contained in the first linear binder.

In some embodiments, optionally, the carboxylate moiety is a lithium carboxylate moiety. The selection of the lithium carboxylate moiety can effectively form relatively strong ionic bonding with the first and second organic particles, the organic-inorganic hybrid particles and the inorganic particles, which further improves the temperature resistance of the overall coating, especially with good temperature resistance when the temperature is higher than 130° C., the separator does not shrink, and the separator does not shrink when a lot of heat is generated by puncturing of a needle, so that the positive and negative electrodes do not contact with each other in large area. Therefore, the puncturing depth is greatly improved. This effect is to penetrate the coating, the base film and the coating interface, this effect has a strong polarity, and due to the presence of lithium ions, the infiltration and diffusion of the electrolytic solution are accelerated, and the kinetic performance of the battery cell is improved.

In some embodiments, in the organic-inorganic hybrid composite compound particles of the above formula (I), optionally, M is a cation of one or more metals selected from: Zn, Co, Cu, Fe, Cd, Mn, Mg, Cr, Ni, Y, Na, and K; more optionally, M is a cation of one or more metals selected from Co, Fe, Mn and Ni. By selecting the metal ion M in formula (I), the high temperature stability of the organic-inorganic hybrid composite compound particles can be improved, thereby improving the safety of the secondary battery.

In some embodiments, in the organic-inorganic hybrid composite compound particles of the above formula (I), A is an atom or a cation of one or more metal elements and/or one or more molecules selected from: Li, Na, K, Zn, $H_2O$, $CO_2$, $NH_3$, $CH_4$, and methyl formate; more optionally, A is an atom or cation of one or more metal elements selected from: Li, Na and K. By selecting the moiety A in formula (I), the endophilicity of the electrolytic solution of the organic-inorganic hybrid composite compound can be improved, the liquid retaining capacity is improved, and the kinetic performance of the secondary battery is improved.

In some embodiments, optionally, z is a value from 1.8 to 2.

In some embodiments, optionally, L is one or more ligands selected from: a cyano group, a thiocyanate group or nitrile; more optionally, L is a cyano group. By selecting the ligand L in formula (I), the chemical bonding between the organic-inorganic hybrid composite compound particles and the first binder can be further improved, the ionic conductivity is improved, the resistance value of the separator is reduced, and the kinetic performance of the battery cell is improved.

In some embodiments, optionally, the organic-inorganic hybrid composite compound is $(CN)_6[FeMn]K_2$, $(CN)_{5.7}[Co_{0.95}Fe]K_{1.8}$, or $(CN)_{5.98}[Fe_{0.99}Mn]Na_{1.99}$.

In some embodiments, number-average particle sizes of the organic particles, the first organic particles, the second organic particles and the organic-inorganic hybrid composite compound particles in the separator of the present application are respectively defined as $R_I$, $R_{O1}$, $R_{O2}$ and $R_{O-I}$, which satisfy 0.2 μm≤min{$R_{O1}$, $R_{O2}$}−max{$R_I$, $R_{O-I}$}≤10 μm; optionally, 1 μm≤min{$R_{O1}$, $R_{O2}$}−max {$R_I$, $R_{O-I}$}≤10 μm; more optionally, 1.5 μm≤min{$R_{O1}$, $R_{O2}$}−<7 μm. By making the number-average particle sizes of various particles in the separator satisfy the above relationship, it can be ensured that the stress generated in the process of charging and discharging of the battery cell is timely released, and the safety performance of the battery cell is improved. Meanwhile, the above number-average particle size relationship could make suitable pores exist between the separator and the electrode sheet in the battery cell to facilitate the infiltration of the electrolytic solution and the transportation of lithium ions, thereby improving the cycle performance of the battery cell.

As defined k=min{$R_{O1}$, $R_{O2}$}−max{$R_I$, $R_{O-I}$}, in some embodiments, k can be in a range of combination of any values of 10 μm, 9.5 μm, 9 μm, 8.5 μm, 8 μm, 7.5 μm, 7 μm, 6.5 μm, 6 μm, 5.5 μm, 5 μm, 4.5 μm, 4 μm, 3.5 μm, 3 μm, 2.5 μm, or 2 μm as an upper limit, and 0.2 μm, 0.4 μm, 0.6 μm, 0.8 μm, 1.0 μm, 1.2 μm, 1.4 μm, 1.6 μm, 1.8 μm or 2.0 μm as a lower limit.

By controlling Dv50 of the inorganic particles, the first organic particles, the second organic particles, and the organic-inorganic hybrid composite compound particles respectively within the ranges described below, the separator of the present application that satisfies the above relational formula can be obtained.

In some embodiments, the first organic particles and the second organic particles in the separator of the present application have the same or different particle size.

In some embodiments, in the separator of the present application, Dv50 of the first organic particles is 5 μm to 30 μm, optionally, 8 μm to 18 μm. In some embodiments, Dv50 of the first organic particles may be in a range of combination of any two values of 5 μm, 6 μm, 7 μm, 8 μm, 9 μm, 10 μm, 11 μm, 12 μm, 13 μm, 14 μm, um, 16 μm, 17 μm, 18 μm, 20 μm, 22 μm, 24 μm, 26 μm, 28 μm or 30 μm. In some embodiments, in the separator of the present application, Dv50 of the second organic particles is 2 μm to 11.5 μm, optionally, 3.2 μm to 8.5 μm. In some embodiments, Dv50 of the second organic particles may be in a range of combination of any two values of 2 μm, 3 μm, 3.5 μm, 4 μm, 4.5 μm, 5 μm, 5.5 μm, 6 μm, 6.5 μm, 7 μm, 7.5 μm, 8 μm, 8.5 μm, 9 μm, 9.5 μm, 10 μm, 10.5 μm, 11 μm or 11.5 μm. When Dv50 of the first organic particles and that of the second organic particles are in the above ranges respectively, there are sufficient pores between the electrode sheet and the separator in the battery cell and between various organic particles that constitute the bulges of the separator, so as to facilitate infiltration and flow of the electrolytic solution. Moreover, according to the separator of the present application, even if the first and second organic particles of the separator of the present application swell in the electrolytic solution, the cycle performance of the battery can be improved. Specifically, the first and second organic particles, especially the second organic particles, can properly absorb the electrolytic solution, so that in the later period of the cycle, when the lack of the electrolytic solution causes the coating to be inorganic or the electrolytic solution between the organic-inorganic hybrid particles is consumed up, the absorption of the electrolytic solution in the first and second organic particles can play the role of conducting lithium ions.

In some embodiments, in the separator of the present application, Dv50 of the organic-inorganic hybrid composite compound particles is 0.01 μm to 3 μm, optionally, 0.1 μm to 2 μm. In some embodiments, Dv50 of the first organic particles may be in a range of combination of any two values of 0.01 μm, 0.05 μm, 0.1 μm, 1.2 μm, 1.4 μm, 1.6 μm, 1.7 μm, 1.8 μm, 1.9 μm, 2.0 μm, 2.2 μm, 2.4 μm, 2.6 μm, 2.8 μm or 3 μm. When Dv50 of the organic-inorganic hybrid composite compound particles is in the given range, it is beneficial to improvement of the compactness of the coating, thereby improving the heat resistance of the separator and improving the safety; it is not easy to block the pore structures in the separator; it has good ion conduction capability and reduces impedance; and it is beneficial to obtaining a smaller coating thickness and increasing the energy density of the battery cell.

In some embodiments, in the separator of the present application, Dv50 of the inorganic particles is 0.05 μm to 2 μm. In some embodiments, Dv50 of the inorganic particles may be in a range of combination of any two values of 0.1 μm, 0.2 μm, 0.3 μm, 0.4 μm, 0.5 μm, 1 μm, 1.2 μm, 1.4 μm, 1.6 μm, 1.8 μm, or 2 μm. When Dv50 of the inorganic particles is in the given range, it is beneficial to obtaining a smaller coating thickness, which can ensure that the volumetric energy density of the battery and be further improved on the premise of good cycle performance and safety performance of the battery.

In some embodiments, in the separator of the present application, the first organic particles are particles of a homopolymer or copolymer containing one or more substituent groups selected from halogen, a phenyl group, an epoxy group, a cyano group, an ester group, and an amide group. In some embodiments, optionally, the first organic particles are particles of a homopolymer or copolymer containing a halogen substituent group. When the first organic particles have the above substituent group, it is beneficial to the chemical action with the first binder and provision of moderate bonding between the separator and the electrode sheet (especially the positive electrode sheet), thereby improving safety and shaping. In addition, the presence of the above substituent group can improve the electrochemical stability of the first organic particles (that is, they not easily react with the electrolytic solution), and make the first organic particles moderately swell in the electrolytic solution, thereby improving the kinetic performance of the battery cell.

In some embodiments, in the separator of the present application, the second organic particles are particles of a homopolymer or copolymer containing one or more substituent groups selected from a phenyl group, an epoxy group, a cyano group, an ester group, a hydroxyl group, a carboxyl group, a sulfonyl ester group, and a pyrrolidone group. In some embodiments, optionally, the second organic particles are particles of a homopolymer or copolymer containing a phenyl substituent group and/or an ester substituent group. When the second organic particles have the above substituent group, it is beneficial to the chemical action with the first binder and the provision of moderate bonding between the separator and the electrode sheet (especially the negative electrode sheet), thereby improving the shaping and kinetic performance of the battery cell. In addition, the above substituent group helps the second organic particles to swell properly in the electrolytic solution, thereby improving the kinetic performance of the battery cell.

In some embodiments, in the separator of the present application, a specific surface area (BET) of the organic-inorganic hybrid composite compound particles is 1 $m^2/g$ to 50 $m^2/g$, optionally, 2 $m^2/g$ to 30 $m^2/g$, more optionally, 4.5 $m^2/g$ to 28 $m^2/g$. In some embodiments, the specific surface area of the organic-inorganic hybrid composite compound particles may be in a range of combination of any two values of 1 $m^2/g$, 5 $m^2/g$, 10 $m^2/g$, 15 $m^2/g$, 20 $m^2/g$, 25 $m^2/g$, 30 $m^2/g$, 35 $m^2/g$, 40 $m^2/g$, 45 $m^2/g$ or 50 $m^2/g$. When the specific surface area of the organic-inorganic hybrid composite compound particles is in the given range, the number of functional groups exposed on the surfaces of the particles is conducive to proper chemical reactions with the first binder and the like.

In some embodiments, in the separator of the present application, the first organic particles are secondary particles. The first organic particles are secondary particles, which is beneficial to obtaining a good coating interface, and effectively improves dislocation of an electrode tab in the producing process of the battery, thereby improving the safety performance of the battery.

In some embodiments, in the separator of the present application, the second organic particles are primary particles. The second organic particles are primary particles, and it is not easy to form a large-area adhesive film structure between particles, thereby further improving the rate performance and safety performance of the battery.

A large-area adhesive film structure can be formed by the use of the above first organic particles and second organic particles in combination when the battery is at high temperature, to reduce or block ion transport channels, so as to delay the heat spread and improve the safety at high temperature; moreover, the use of the above two in combination can further effectively improve the infiltration and distribution uniformity of the electrolytic solution in the separator, and further improve the cycle performance of the battery.

It should be noted that the terms "primary particle" and "secondary particle" have meanings well known in the art. "Primary particle" refers to a non-agglomerated particle. "Secondary particle" refers to an agglomerated particle formed by the aggregation of two or more primary particles.

In some embodiments, in the separator of the present application, calculated based on a total weight of all monomers contained in the linear copolymer, the linear copolymer is a polymerization product containing the following types of monomers:

(1) a first type of monomer, the first type of monomer is selected from at least one of: acrylic acid, methacrylic acid, methyl methacrylate, tert-butyl methacrylate, isobornyl methacrylate, methylolacrylamide, acrylamide, styrene, and acrylonitrile; optionally, the first type of monomer is selected from at least one of: styrene, (2) a second type of monomer, the second type of monomer is selected from at least one of: ethyl acrylate, n-butyl acrylate, isobutyl acrylate, tert-butyl acrylate, 2-ethylhexyl acrylate, n-octyl acrylate, decyl acrylate, cyclohexyl acrylate, ethyl methacrylate, n-butyl methacrylate, isobutyl methacrylate, 2-ethylhexyl methacrylate, lauryl methacrylate, n-hexyl methacrylate, tridecyl methacrylate, octadecyl methacrylate, cyclohexyl methacrylate, benzyl methacrylate, ethyleneurea ethyl methacrylate, dicyclopentene ethoxy methacrylate, tetrahydrofuryl methacrylate, trifluoroethyl methacrylate, ethyleneurea ethyl methacrylate, propylene methacrylate, dicyclopentene ethoxy methacrylate, tetrahydrofuryl methacrylate, and trifluoroethyl methacrylate; optionally, the second type of monomer is selected from at least one of: n-butyl acrylate, and n-hexyl methacrylate;

(3) a third type of monomer, the third type of monomer is selected from at least one of: 2-hydroxyethyl acrylate, 2-hydroxypropyl acrylate, 2-hydroxyethyl methacrylate, 2-hydroxypropyl methacrylate, glycidyl acrylate, glycidyl methacrylate, dimethylamino ethyl methacrylate, diethylaminoethyl methacrylate, vinyltrimethoxysilane, vinyltriethoxysilane, vinyltriisopropoxysilane, γ-methacryloxypropyltrimethoxysilane, N-methylolacrylamide, N-butoxymethyl(methyl)acrylamide, diacetone acrylamide (DAAM), acetoacetoxy ethyl methacrylate (AAEM), divinylbenzene, and epoxy resin with an epoxy value of 0.35~0.50; optionally, the third type of monomer is selected from at least one of: 2-hydroxyethyl methacrylate, epoxy resin with an epoxy value of 0.35~0.50, and divinylbenzene; and (4) a fourth type of monomer, the fourth type of monomer is selected from at least one of: polyvinyl alcohol, polypropylene alcohol, polypropylene glycol, polyethylene glycol, and polyvinyl acid alcohol, optionally, polyvinyl alcohol, where an alcoholysis degree of the fourth monomer is greater than or equal to 85%, and an average degree of polymerization is 400 to 2000; optionally, an alcoholysis degree is greater than or equal to 88%, and an average degree of polymerization is 500 to 1600.

Due to the inclusion of the linear copolymer having the above monomers, the first binder has good wettability on the substrate to improve the excellent yield for coating and improve the cost advantage, the compactness of the coating is improved, and more importantly, the adhesion between the particle materials, especially the inorganic particles and the organic-inorganic compound, and the substrate is improved, which greatly improves the thermal shrinkage performance of the separator, thereby improving the safety performance of the battery cell. Moreover, chemical actions occur between the first binder and the particle materials in the coating, to form a moderately dense structure to further improve the safety of the separator, and more importantly, this three-dimensional interaction opens the transport channel of lithium ions, improves the ionic conductivity of the separator, and improves the kinetic performance of the battery.

In some embodiments, in the separator of the present application, for the first binder, after polymerizing the first type of monomer, the second type of monomer, the third type of monomer and the fourth type of monomer, a pH regulator is added to adjust pH to 5-7, and the pH regulator is selected from at least one of: lithium hydroxide, calcium hydroxide, sodium hydroxide and ammonia water. In some embodiments, the pH regulator includes lithium hydroxide. In some embodiments, optionally, the pH regulator is lithium hydroxide. After polymerizing the monomers, pH of the system is adjusted by adding a pH regulator, which is beneficial to the dispersion of the inorganic particles and the organic-inorganic hybrid composite compound particles in the first binder, thereby further improving the coating interface, and improving the cycle performance and safety performance of the battery cell. Particularly, in some embodiments, the pH regulator is lithium hydroxide. Without being bound by any theory, the inventor has found that using lithium hydroxide as a pH regulator, with the adjustment of pH, the lithium ions brought by the pH regulator can improve the conductivity and increase the glass transition temperature (Tg) of the obtained separator, thereby further improving the cycle performance and safety performance of the separator.

In some embodiments, in the separator of the present application, the first type of monomer accounts for 60 wt % to 85 wt %, optionally, 70 wt % to 80 wt %; and/or the second type of monomer accounts for 1 wt % to 10 wt %, optionally, 5 wt % to 10 wt %; and/or the third type of monomer accounts for 1 wt % to 10 wt %, optionally, 1 wt % to 5 wt %; and/or the fourth type of monomer accounts for 1 wt % to 20 wt %, optionally, 10 wt % to 15 wt %, calculated based on a total weight of all monomers contained in the linear copolymer(s).

In some embodiments, the proportion of the first type of monomer may be in a range of combination of any two values of 60, 62, 64, 66, 68, 70, 72, 74, 76, 78, 80, 82 or 85 wt %.

In some embodiments, the proportion of the second type of monomer may be in a range of combination of any two values of 1, 2, 3, 4, 5, 6, 7, 8, 9 or 10 wt %.

In some embodiments, the proportion of the third type of monomer may be in a range of combination of any two values of 1, 2, 3, 4, 5, 6, 7, 8, 9 or 10 wt %.

In some embodiments, the proportion of the fourth type of monomer may be in a range of combination of any two values of 1, 2, 3, 4, 5, 6, 7, 8, 9, 10, 11, 12, 13, 14, 15, 16, 17, 18, 19 or 20.

The separator of the present application can be obtained by controlling the content of each monomer within the above range.

In some embodiments, in the separator of the present application, the linear copolymer is a polymer selected from:

A. a 30% styrene-15% methacrylic acid-10% acrylamide-15% acrylic acid-5% acrylonitrile-10% n-butyl acrylate-2% 2-hydroxyethyl methacrylate-1% E44 epoxy resin-12% polyvinyl alcohol copolymer;

B. a 30% styrene-15% methacrylic acid-10% acrylamide-15% acrylic acid-5% acrylonitrile-10% n-butyl acrylate-2% 2-hydroxyethyl methacrylate-1% E44 epoxy resin-12% polyvinyl alcohol copolymer;

C. a 30% styrene-15% methacrylic acid-10% acrylamide-15% acrylic acid-5% acrylonitrile-10% n-butyl acrylate-2% 2-hydroxyethyl methacrylate-1% E44 epoxy resin-12% polyvinyl alcohol copolymer;

D. a 35% styrene-15% methacrylic acid-10% acrylamide-15% acrylic acid-5% acrylonitrile-5% n-butyl acrylate-2% 2-hydroxyethyl methacrylate-1% E44 epoxy resin-12% polyvinyl alcohol copolymer;

E. a 30% styrene-15% methacrylic acid-10% acrylamide-15% acrylic acid-5% acrylonitrile-10% n-butyl acrylate-3% 2-hydroxyethyl methacrylate-12% polyvinyl alcohol copolymer;

F. a 30% styrene-15% methacrylic acid-15% acrylamide-15% acrylic acid-5% acrylonitrile-5% n-butyl acrylate- 2% 2-hydroxyethyl methacrylate-1% E44 epoxy resin-12% polyvinyl alcohol copolymer;

G. a 40% styrene-10% acrylamide-15% acrylic acid-10% n-butyl acrylate-5% n-hexyl methacrylate-2% 2-hydroxyethyl methacrylate-1% E44 epoxy resin-12% polyvinyl alcohol copolymer; and H. a 35% styrene-15% methacrylic acid-10% acrylamide-15% acrylic acid-5% acrylonitrile-10% n-butyl acrylate-2% divinylbenzene-1% E44 epoxy resin-12% polyvinyl alcohol copolymer;

where an average epoxy value of the E44 epoxy resin is 0.44, an alcoholysis degree of the polyvinyl alcohol is 88% and a degree of polymerization of the polyvinyl alcohol is 1000, and the percentage is a weight percentage of a monomer, calculated based on a total weight of all monomers.

In some embodiments, in the separator of the present application, a weight-average molecular weight of the linear copolymer(s) is $1\times10^3$ g/mol to $200\times10^3$ g/mol, optionally, $2\times10^3$ g/mol to $80\times10^3$ g/mol. In some embodiments, a weight-average molecular weight of the linear copolymer may be in a range of combination of any two values of $1\times10^3$ g/mol, $5\times10^3$ g/mol, $10\times10^3$ g/mol, $20\times10^3$ g/mol, $30\times10^3$ g/mol, $40\times10^3$ g/mol, $50\times10^3$ g/mol, $60\times10^3$ g/mol, $70\times10^3$ g/mol, $80\times10^3$ g/mol, 100×10 3 g/mol, $150\times10^3$ g/mol or $200\times10^3$ g/mol. The weight-average molecular weight of the linear copolymer is controlled within the above range, so that the linear copolymer can have a moderate chemical action with the particular material, and have a moderate infiltration effect with the substrate.

In some embodiments, the first organic particles are at least one selected from: a homopolymer or copolymer of fluorine-containing alkenyl monomer units, a homopolymer or copolymer of olefin monomer units, a homopolymer or copolymer of unsaturated nitrile monomer units, a homopolymer or copolymer of alkylene oxide monomer units, a bipolymer, homopolymer or copolymer of monosaccharide monomer units, and modified compounds of the above homopolymers or copolymers.

In some embodiments, the fluorine-containing alkenyl monomer unit may be selected from one or more of vinyl difluoride, vinylidene fluoride, trifluoroethylene, chlorotrifluoroethylene, tetrafluoroethylene, hexafluoropropylene, or derivatives thereof.

In some embodiments, the olefin monomer unit may be selected from one or more of ethylene, propylene, butadiene, isoprene, styrene, or derivatives thereof.

In some embodiments, the unsaturated nitrile monomer unit may be selected from one or more of acrylonitrile, methacrylonitrile, or derivatives thereof.

In some embodiments, the alkylene oxide monomer unit may be selected from one or more of ethylene oxide, propylene oxide, or derivatives thereof.

In some embodiments, the monosaccharide monomer unit may be selected from glucose or derivatives thereof.

In some embodiments, the first organic particles may include polyperfluorinated ethylene, polychlorotrifluoroethylene, polyvinyl fluoride, polyvinylidene fluoride, polyethylene, polypropylene, polyacrylonitrile, polyethylene oxide, a copolymer of different fluorine-containing alkenyl monomer units, a copolymer of a fluorine-containing alkenyl monomer unit and an olefin monomer unit, a copolymer of a fluorine-containing alkenyl monomer unit and an acrylic monomer unit, a copolymer of a fluorine-containing fluorine-containing alkenyl monomer unit and an acrylate monomer unit, a disaccharide substance, a polysaccharide substance, and modified compounds of the above homopolymers or copolymers.

In some embodiments, optionally, the first organic particles are at least one selected from: polyperfluorinated ethylene, polyvinylidene fluoride, polyvinylidene fluoride-co-hexafluoropropylene, polyvinylidene fluoride-co-trichloroethylene, polystyrene-co-methyl methacrylate, polystyrene-co-butyl acrylate, polymethyl methacrylate, polyacrylonitrile, polyvinyl acetate, polyethylene-co-vinyl acetate, polyimide, polyethylene oxide, cellulose acetate, cellulose acetate butyrate, cellulose acetate propionate, cyanoethyl pullulan, cyanoethyl polyvinyl alcohol, cyanoethyl cellulose, and cyanoethyl sucrose.

In some embodiments, more optionally, the first organic particles are at least one selected from: polyvinylidene fluoride-co-hexafluoropropylene, polystyrene-co-butyl acrylate, polyperfluorinated ethylene, polyvinylidene fluoride, or polyvinylidene fluoride-co-trichloroethylene; still more optionally, the first organic particles are polyvinylidene fluoride-co-hexafluoropropylene.

The above first organic particles are bonded properly with the electrode sheet, which improves the shaping capability and stress release in the cycle process, and improves the safety and kinetic performance of the battery cell.

In some embodiments, the second organic particles are at least one selected from: a homopolymer or copolymer of acrylate monomer units, a homopolymer or copolymer of acrylic acid monomer units, a homopolymer or copolymer of unsaturated nitrile monomer units, a homopolymer or copolymer of ethylenic monomer units, a homopolymer or copolymer of styrene monomer units, a homopolymer or copolymer of epoxy monomer units, a polyurethane compound, a rubber compound, a bipolymer, homopolymer or copolymer of monosaccharide monomer units, and modified compounds of the above homopolymers or copolymers.

In some embodiments, the second organic particles may include one or more of a copolymer of an acrylate monomer unit and a styrene monomer unit, a copolymer of an acrylic monomer unit and a styrene monomer unit, a copolymer of acrylic monomer unit-acrylate monomer unit-styrene monomer unit, a copolymer of a styrene monomer unit and an unsaturated nitrile monomer unit, a copolymer of styrene monomer unit-olefin monomer unit-unsaturated nitrile monomer unit, a copolymer of a styrene monomer unit and an acrylate monomer unit, a copolymer of acrylonitrile monomer unit-styrene monomer unit-butadiene monomer unit, a copolymer of acrylic monomer unit-acrylate monomer unit-styrene monomer unit, and modified compounds of the above copolymers.

In some embodiments, the acrylate monomer unit may be selected from one or more of methyl acrylate, ethyl acrylate, propyl acrylate, butyl acrylate, methyl methacrylate, butyl methacrylate, isooctyl methacrylate, or derivatives thereof.

In some embodiments, the ethylenic monomer unit may be selected from one or more of ethylene, vinyl acetate, butadiene, or derivatives thereof.

In some embodiments, the acrylic monomer unit may be selected from one or more of acrylic acid, methacrylic acid, or derivatives thereof.

In some embodiments, the styrene monomer unit may be selected from one or more of styrene, methylstyrene, or derivatives thereof.

In some embodiments, the unsaturated nitrile monomer unit may be selected from one or more of acrylonitrile, methacrylonitrile or derivatives thereof.

In some embodiments, the epoxy monomer unit may be selected from one or more of acrylic acid, methacrylic acid, or derivatives thereof.

In some embodiments, the monosaccharide monomer unit may be selected from glucose or derivatives thereof.

In some embodiments, optionally, the second organic particles are selected from at least one of: polymethyl methacrylate, polyacrylonitrile, polyvinylpyrrolidone, polyvinyl acetate, polyethylene-co-vinyl acetate, polystyrene-co-methyl methacrylate, polystyrene-co-butyl acrylate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, an acrylonitrile-styrene-butadiene copolymer, a styrene-butyl acrylate-isooctyl acrylate copolymer, and polyimide. More optionally, the second organic particles are a styrene-butyl acrylate-isooctyl acrylate copolymer.

The above second organic particles can maintain proper swelling and improve the ion conduction capability, and are bonded properly with the electrode sheet, which improves the shaping capability and stress release in the cycle process, and improves the safety and kinetic performance of the battery cell.

As used herein, the term "modified compounds of each homopolymer or copolymer" refers to a modified compound obtained by copolymerizing a monomer unit in each homopolymer or copolymer with a monomer unit containing specific functional groups. For example, a fluorine-containing alkenyl monomer unit can copolymerized with a compound containing carboxyl functional groups to obtain its modified compound.

In some embodiments, in the separator of the present application, a weight-average molecular weight of the first organic particles is $300\times10^3$ g/mol to $800\times10^3$ g/mol, optionally, $400\times10^3$ g/mol to $650\times10^3$ g/mol. In some embodiments, in the separator of the present application, a weight-average molecular weight of the second organic particles is $10\times10^3$ g/mol to $100\times10^3$ g/mol, optionally, $20\times10^3$ g/mol to $80\times10^3$ g/mol.

When the weight-average molecular weight of the first organic particles and/or the second organic particles is in the above range, the separator can have proper bonding and swelling.

In some embodiments, in the separator of the present application, calculated based on a total weight of the coating, a content of the inorganic particles is 0 to 44 wt %, optionally, 10 to 35 wt %. In some embodiments, the content of the inorganic particles may be in a range of combination of any two values of 0, 5, 10, 15, 20, 25, 30, 35, 40 or 44 wt %. When the mass proportion of the inorganic particles in the coating is controlled within the given range, it can be ensured that the mass energy density of the battery is further improved on the premise of good safety performance of the battery.

In some embodiments, in the separator of the present application, calculated based on a total weight of the coating, a content of the organic-inorganic hybrid composite compound particles is 30 to 74 wt %, optionally, 39 to 64 wt %. In some embodiments, the content of the organic-inorganic hybrid composite compound particles may be in a range of combination of any two values of 30, 35, 40, 45, 50, 55, 60, 65, 70 or 74 wt %. When the mass proportion of the organic-inorganic hybrid composite compound particles in the coating is controlled within the given range, heat resistance can be ensured, the ion conduction capability is improved, and impedance is reduced, which facilitates the formation of a moderately dense network structure in the coating, thereby improving the kinetic performance and safety performance of the battery cell.

In some embodiments, in the separator of the present application, calculated based on a total weight of the coating, a content of the first binder is 2 to 8 wt %. In some embodiments, the content of the first binder may be in a range of combination of any two values of 2, 2.5, 3, 3.5, 4, 4.5, 5, 5.5, 6, 6.5, 7, 7.5 or 8 wt %. When the mass proportion of the first binder in the coating is controlled within the given range, moderate infiltration of the particle materials and the substrate can be ensured, a three-dimensional network can be moderately generated in the coating, and the safety and kinetic performance of the battery cell can be improved.

In some embodiments, in the separator of the present application, calculated based on a total weight of the coating, a total content of the first organic particles and the second organic particles is 16 to 31 wt %. In some embodiments, the total content of the first and second organic particles may be in a range of combination of any two values of 16, 17, 18, 19, 20, 21, 22, 23, 24, 25, 26, 27, 28, 29, 30 or 31 wt %. When the total content of the first organic particles and the second organic particles in the coating is controlled within the given range, the separator can have good bonding performance.

In some embodiments, in the separator of the present application, a weight ratio of the first organic particles to the second organic particles is 1:2 to 6:1, optionally, 2:1 to 5:1, more optionally, 2.5:1 to 3.5:1, still more optionally, 2.8:1 to 3.3:1. In some embodiments, the weight ratio of the first organic particles to the second organic particles may be in a range of combination of any two ratios of 1:2, 1:1, 2:1, 3:1, 4:1, 5:1 or 6:1. By controlling the weight ratio of the first organic particles to the second organic particles in the coating within the above range, on one hand, the first organic particles are secondary particles, which helps to form a uniform coating interface and can effectively improve dislocation of an electrode tab in the producing process of the battery, thereby improving the safety performance of the battery. The second organic particles are primary particles, and it is not easy to form a large-area adhesive film structure between particles, thereby further improving the rate performance and safety performance of the battery. On the other hand, the use of the two in combination can effectively improve the infiltration and distribution uniformity of the electrolytic solution, and further improve the high-temperature storage performance of the battery. Particularly, when the battery is punctured by a foreign matter during use, the second organic particles can instantly wrap the foreign matter and exposed copper foil or aluminum foil to form a first polymer insulating layer, which effectively reduces the probability of occurrence of short circuit between the positive and negative electrodes and improves the safety performance of the battery, and as the temperature around the foreign matter rises, the first organic particles form a stronger second polymer insulating layer around the first polymer insulating layer, thereby further improving the safety performance of the battery.

By selecting the appropriate contents of the inorganic particles, the organic-inorganic hybrid composite compound particles, the first organic particles and the second organic particles, the separator can have an appropriate non-uniform pore structure on the premise of ensuring the safety performance, and conversion to light fraction of the separator is achieved, which is conducive to the infiltration and flow of the electrolytic solution, and further improves the energy density of the battery cell.

In some embodiments, in the separator of the present application, viscosity of the first binder is 150-400 mPa·s, optionally, 200-300 mPa·s. In some embodiments, the viscosity of the first binder may be in a range of combination of any two values of 150, 175, 200, 225, 250, 275, 300, 325, 350, 375 or 400 mPa·s. When the viscosity of the first binder is controlled within the above range, the first binder properly infiltrates the substrate, which prevents the migration of the first binder to pores of the separator, reduces the risk of excessive increase in the air permeability of the separator, and improves the heat resistance and kinetic performance of the separator.

In some embodiments, in the separator of the present application, a ratio of a total weight of the first organic particles and the second organic particles to a total weight of the inorganic particles and the organic-inorganic hybrid composite compound particles is 1:5 to 1:2. The weight ratio of the organic particles (i.e., the first organic particles and the second organic particles) to the inorganic particles (i.e., the inorganic particles and the organic-inorganic hybrid composite compound particles) can balance the bonding and heat resistance of the separator. Specifically, when the content of the organic particles is too much, the bonding of the separator is good, and the heat resistance is poor; and when the content of the organic particles is too small, the bonding of the separator is poor and the heat resistance is good.

In some embodiments, in the separator of the present application, the inorganic particles are selected from one or more of: boehmite (γ-AlOOH), alumina ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconia ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluorine ($MgF_2$). In some embodiments, optionally, the inorganic particles include boehmite, alumina, or a combination thereof. By selecting the above inorganic particles, the thermal shrinkage of the separator can be advantageously inhibited, and its heat resistance is improved.

In the present application, the substrate is a film material with a porous structure having good chemical stability and mechanical stability. In some embodiments, the substrate can be a single-layer film material, or a multilayer composite film material. When the separator is a multilayer composite film material, the material of each layer can be the same or different.

In some embodiments, in the separator of the present application, the substrate may be a porous film or a porous nonwoven network containing one or more selected from: polyethylene, polypropylene, polyethylene glycol terephthalate, polybutylene terephthalate, polyester, polyacetal, polyamide, polycarbonate, polyimide, polyetheretherketone, polyaryletherketone, poly etherimide, polyamideimide, polybenzimidazole, polyethersulfone, polyphenyl ether, a cycloolefin copolymer, polyphenylene sulfide, and polyethylene naphthalene. In some embodiments, optionally, the substrate is a porous film or a porous nonwoven network containing polyethylene or polypropylene. The separator is prepared by selecting the above substrate, which is beneficial to the combination of the substrate with the coating through the first binder, and the formation of a porous separator that is moderately dense and is conductive to lithium ions.

In some embodiments, in the separator of the present application, porosity of the substrate is 10% to 95%, optionally, 35% to 45%. The probability of contact between the positive electrode sheet and the negative electrode sheet is reduced while the ion conduction performance of the separator is improved. In some embodiments, in the separator of the present application, the substrate has a pore diameter of 0.1 μm to 50 μm, optionally, 0.1 μm to 5 μm. By selecting the substrate with the above pore structure, the separator has good ion conduction performance, and the probability of direct contact between the positive and negative electrode sheets is reduced, thereby improving the kinetic performance and safety performance of the battery cell.

In some embodiments, in the separator of the present application, the coating further contains a second binder and/or one or more additives. These substances each are not granular substances in the coating, and the present application has no special limitation on the types of these substances.

In some embodiments, the second binder is a different substance from the first binder. In the separator of the present application, the second binder is mainly used to disperse the first organic particles, and can further improve the adhesion between the first organic particles and the base film. The second binder may be selected from any suitable binder known in the art that is electrochemically stable at 0~5 v and does not react with the electrolytic solution, for example, a polymer obtained by polymerizing monomers, such as acrylic acid, acrylate, acrylonitrile, and acrylamide. Optionally, the second binder is a copolymer obtained by copolymerization of 15% acrylic acid-15% methyl acrylate-62% acrylonitrile-8% acrylamide, where the percentage is a weight percentage, calculated based on the total weight of all monomers in the copolymer. Optionally, the second binder is a polyacrylic acid-acrylate-acrylonitrile copolymer. In some embodiments, a content of the second binder in the coating is 0.5-3 wt %, calculated based on the total weight of the coating.

The separator of the present application further includes an additive; it may be any suitable additive known in the art that is electrochemically stable at 0-5V and does not react with the electrolytic solution, for example, a dispersant for dispersing inorganic particles and organic-inorganic hybrid particles, a stabilizer or thickener for avoiding sedimentation and agglomeration in the slurry production process, and a wetting agent for ensuring that the slurry wets the base film better in the high-speed coating process. In some embodiments, the additive includes a stabilizer and/or a wetting agent. The stabilizer is used to disperse the first organic particles. The wetting agent is used to disperse the inorganic particles and the organic-inorganic hybrid particles, and prevent sedimentation and agglomeration in the slurry production process. The wetting agent ensures that the slurry wets the base film better in the high-speed coating process. In some embodiments, a content of the additive in the coating is 0.2-1 wt %, calculated based on the total weight of the coating. In some embodiments, the stabilizer may be any suitable stabilizer known in the art, for example, a modified cellulose, such as sodium carboxymethyl cellulose. In some embodiments, a content of the stabilizer in the coating is 0.1-0.6 wt %, calculated based on the total weight of the coating. In some embodiments, the wetting agent may be any suitable stabilizer known in the art, which is typically a non-ionic surfactant, for example, a silicone-modified polyether. Optionally, it may be polyoxyethylene ether. In some embodiments, a content of the wetting agent in the coating is 0-0.5%, calculated based on the total weight of the coating.

In some embodiments, the coating weight on one side of the separator per unit area is equal to or less than 3.0 $g/m^2$; for example, the coating weight on one side of the separator per unit area may be 1.5 $g/m^2$-3.0 $g/m^2$, 1.5 $g/m^2$-2.5 $g/m^2$, 1.8 $g/m^2$-2.3 $g/m^2$. The coating weight on one side of the separator per unit area is controlled within the given range, which can further take into account the rate performance and safety performance of the battery on the premise of improving the energy density of the battery.

In some embodiments, the thickness of the substrate is equal to or less than 10 μm; for example, the thickness of the substrate may be 5 μm-10 μm, 5 μm-9 μm, 7 μm-9 μm. When the thickness of the substrate is controlled within the given range, the energy density of the battery can be further improved on the premise of ensuring the rate performance and safety performance of the battery.

In some embodiments of the present application, a peeling force of the coating is above 40 N/m; after the separator is placed in an unclamped state in an environment at 150° C. for 1 hour, the percentages of heat shrinkage of the separator in the longitudinal direction (MD) or transverse direction (TD) each are below 5%; the size of the damage made by a heat gun at 200° C. is 0; and the adhesion between the separator and the electrode is above 1.0 N/m, and the ion conductivity at 25° C. is above 0.95 ms/cm. According to some embodiments, the air permeability, transverse tensile strength (MD), longitudinal tensile strength (TD), transverse elongation at break, and longitudinal elongation at break of the separator all have meanings well known in the art, and can be measured using the methods known in the art. For example, tests can be performed with reference to the standard GB/T 36363-2018.

According to some embodiments, the particle sizes and number-average particle sizes of various particles may be tested using devices and methods known in the art. For example, a scanning electron microscope (SEM) picture of the separator is obtained using a scanning electron microscope (for example, ZEISS Sigma 300) with reference to JY/T010-1996. As an example, the test may be performed according to the following method: randomly selecting a test sample with length×width=50 mm×100 mm on the separator, randomly selecting multiple test areas (for example, 5 test areas) in the test sample, reading a particle size of each organic particle in each test area at a certain magnification (for example, at a magnification of 500 times when measuring the first organic particles, and at a magnification of 1000 times when measuring the second organic particles) (it should be noted that when the organic particles are in irregular shape, the distance between the farthest two points on an organic particle is taken as a particle size of the organic particle), counting the number of organic particles in each test area and the values of particle sizes thereof, and calculating an arithmetic mean value of the particle sizes of the organic particles in each test area, that is, a number-average particle size of the organic particles in the test sample. In order to ensure the accuracy of the test result, multiple test samples (for example, 10 test samples) can be taken to perform the above test repeatedly, and an average value of each test sample is taken as a final test result.

As used herein, the term "number-average particle size" refers to a particle size measured according to the method described above.

According to some embodiments, the types of substance of organic particles may be tested using devices and methods known in the art. For example, the infrared spectrum of a material can be tested to determine characteristic peaks it contains, thereby determining the type of substance. Specifically, infrared spectroscopic analysis of organic particles can be carried out using instruments and methods well known in the art, for example, infrared spectrometers, such as IS10 Fourier transform infrared spectrometers from Nicolet Corporation of the United States, according to GB/T6040-2002 Genera rules for infrared analysis.

According to some embodiments, volume average particle sizes Dv50 of various particles in the present application has the meaning well known in the art, and they can be measured using instruments and methods known in the art. For example, it can be measured using a laser particle size analyzer (such as Master Size 3000) with reference to the standard GB/T 19077-2016 Particle size analysis-Laser diffraction methods.

In some embodiments, the distance between any two adjacent inorganic particles is denoted as L1, the distance between any one inorganic particle and one organic particle adjacent to each other is denoted as L2, and then, L1 is smaller than L2.

According to some embodiments, the distance between any two adjacent inorganic particles refers to: in an SEM image of the separator, taking any two adjacent inorganic particles in the coating (when the inorganic particles are in irregular shape, the particles can be treated with circumscribed circle), testing the distance between centers of circles of the two inorganic particles as the distance between the two inorganic particles, which is denoted as L1.

According to some embodiments, the distance between any one inorganic particle and one organic particle adjacent to each other refers to: in an SEM image of the separator, taking any one inorganic particle and one organic particle adjacent to each other in the coating (when the inorganic particle or organic particle is in irregular shape, the particle can be treated with circumscribed circle), and testing the distance between centers of circles of the inorganic particle and the organic particle as the distance between the inorganic particle and the organic particle, which is denoted as L2. The above organic particle may be the first organic particle, or the second organic particle.

The above distance can be measured using instruments known in the art. For example, it can be measured using a scanning electron microscope. As an example, the distance L2 between any one inorganic particle and one organic particle adjacent to each other can be tested according to the following method: preparing the separator into a test sample with length×width=50 mm×100 mm; and testing the separator using a scanning electron microscope (such as ZEISS Sigma 300). Reference may be made to JY/T010-1996 for the test. An area in the test sample is randomly selected for scanning and testing, an SEM image of the separator is obtained at a certain magnification (for example, 3000 times), any one inorganic particle and one organic particle adjacent to each other are randomly selected in the SEM image (when the inorganic particle or organic particle is in irregular shape, the particle can be treated with circumscribed circle), and the distance between the center of circle of the inorganic particle (or its circumscribed circle) and the center of circle of the organic particle (or its circumscribed circle) is measured, that is, the distance between the adjacent inorganic particle and organic particle described in the present application, which is denoted as L2. In order to ensure the accuracy of the test result, multiple groups of adjacent particles (for example, 10 groups) can be taken from the test sample to perform the above test repeatedly, and an average value of test results of each group is taken as a final result.

Similarly, the distance L1 between any two adjacent inorganic particles can be tested according to the above method.

The separator of the present application can be prepared according to the following method. The method includes the following steps:

(i) providing a substrate;

(ii) providing a coating slurry: the coating slurry including inorganic particles, organic-inorganic hybrid composite compound particles, first organic particles, second organic particles, and a first binder; and (iii) coating the coating slurry described in step (ii) on at least one side of the substrate described in step (i), forming a coating and drying it to obtain the separator;

where the dried coating includes inorganic particles, organic-inorganic hybrid composite compound particles, first organic particles and second organic particles, where the first organic particles and the second organic particles are embedded in the inorganic particles and the organic-inorganic hybrid composite compound particles and form bulges on a surface of the dried coating; where the first and second organic particles, the organic-inorganic hybrid composite compound particles and the first binder are defined as the above.

In some embodiments, in step (ii) of the above method, the coating slurry further includes a second binder and/or one or more additives. In some embodiments, optionally, the second binder is a polyacrylic acid-acrylate-acrylonitrile copolymer. In some embodiments, optionally, the additive includes a stabilizer (optionally, sodium carboxymethyl cellulose) and/or a wetting agent (optionally, polyoxyethylene ether).

In some embodiments, in the above method, the coating slurry further includes a solvent. In some embodiments, optionally, the solvent is water, optionally, deionized water.

In some embodiments, the method satisfies one or more of the following (1)-(13):

(1) in step (ii), the organic particles are added in an amount of 10 to 25 wt %, calculated based on the dry weight of the coating slurry;

(2) in step (ii), a mass ratio of the first organic particles to the second organic particles is 1:2 to 6:1, optionally, 2:1 to 5:1;

(3) in step (ii), the inorganic particles are added in an amount of 0 to 30 wt %, calculated based on the dry weight of the coating slurry;

(4) in step (ii), the organic-inorganic hybrid composite compound particles are added in an amount of 30 to 50 wt %, calculated based on the dry weight of the coating slurry;

(5) in step (ii), the first binder is added in an amount of 2 to 6 wt %, calculated based on the dry weight of the coating slurry;

(6) in step (ii), the second binder is added in an amount of 0.5 to 3 wt %, calculated based on the dry weight of the coating slurry;

(7) in step (ii), the one or more additives are added in an amount of 0.2 to 1 wt %, calculated based on the dry weight of the coating slurry;

(8) in step (ii), a solid content of the coating slurry is 20-40%, optionally, 25-35%, calculated based on the total weight of the coating slurry;

(9) in step (iii), the coating is carried out by the following methods: dip coating, die coating, roll coating, comma coating, spin coating, or a combination thereof;

(10) in step (iii), the speed for the coating is 30-120 m/min, optionally, 40-100 m/min;

(11) in step (iii), the thickness of the coating is 0.5 μm to 5 μm, optionally, 1 μm to 2 μm;

(12) in step (iii), the temperature for the drying is 40° C.-75° C., optionally, 45° C.-70° C.; and

(13) in step (iii), the time for the drying is 2-8 minutes.

As described above, by limiting the temperature (12) and time (13) for the drying step within the above ranges, it can be ensured that the chemical reaction in the coating can be completely carried out while taking into account the production efficiency.

Secondary Battery, Battery Module, Battery Pack, and Power Consumption Apparatus The secondary battery, the battery module, the battery pack, and the power consumption apparatus in the second to fifth aspects of the present application will be described hereinafter with reference to the accompanying drawings as appropriate. A secondary battery is provided in the second aspect of the present application, including the separator in the above first aspect; a battery module is provided in the third aspect of the present application, including the secondary battery in the above second aspect; a battery pack is provided in the fourth aspect of the present application, including the battery module in the above third aspect; and a power consumption apparatus is provided in the fifth aspect of the present application, including at least one selected from the secondary battery in the first aspect, the battery module in the second aspect, or the battery pack in the third aspect of the present application.

In some embodiments, the secondary battery of the present application is a lithium-ion secondary battery.

The secondary battery includes a separator of the present application, a positive electrode sheet, a negative electrode sheet, and an electrolyte. During charging and discharging of the battery, active ions are intercalated and deintercalated back and forth between the positive electrode sheet and the positive electrode sheet. The electrolyte plays the role of conducting ions between the positive electrode sheet and the negative electrode sheet. The separator is provided between the positive electrode sheet and the negative electrode sheet, and mainly plays the role of preventing a short circuit between positive and negative electrodes while allowing the ions to pass.

[Positive Electrode Sheet]

A positive electrode sheet includes a positive electrode current collector and a positive film layer provided on at least one surface of the positive electrode current collector, and the positive film layer includes the positive active material in the first aspect of the present application.

As an example, the positive electrode current collector has two surfaces opposite in its own thickness direction, and the positive film layer is provided on either or both of the two opposite surfaces of the positive electrode current collector.

In some embodiments, the positive electrode current collector may be metal foil or a composite current collector. For example, as the metal foil, aluminum foil may be used. The composite current collector may include a polymer material base layer and a metal layer formed on at least one surface of the polymer material base layer. The composite current collector may be formed by synthesizing a metal material (aluminum, aluminum alloy, nickel, nickel alloy, titanium, titanium alloy, silver and silver alloy, or the like) on a polymer material substrate (such as a substrate of polypropylene (PP), polyethylene glycol terephthalate (PET), polybutylene terephthalate (PBT), polystyrene (PS), polyethylene (PE), or the like).

In some embodiments, the positive active material may be a positive active material for a battery well-known in the art. As an example, the positive active material may include at least one of the following materials: a lithium-containing phosphate of an olivine structure, a lithium transition metal oxide, and their respective modified compounds. However, the present application is not limited to these materials, and other conventional materials that may be used as the positive active material of the battery may also be used. These positive active materials may be used alone, or two or more types may be used in combination. Examples of the lithium transition metal oxide may include, but are not limited to, at least one of a lithium cobalt oxide (such as $LiCoO_2$), a lithium nickel oxide (such as $LiNiO_2$), a lithium manganese oxide (such as $LiMnO_2$, $LiMn_2O_4$), a lithium nickel cobalt oxide, a lithium manganese cobalt oxide, a lithium nickel manganese oxide, a lithium nickel cobalt manganese oxide (such as $LiNi_{1/3}Co_{1/3}Mn_{1/3}O_2$ (or referred to as $NCM_{333}$ for short), $LiNi_{0.5}Co_{0.2}Mn_{0.3}O_2$ (or referred to as $NCM_{523}$ for short), $LiNi_{0.5}Co_{0.25}Mn_{0.25}O_2$ (or referred to as $NCM_{211}$ for short), $LiNi_{0.6}Co_{0.2}Mn_{0.2}O_2$ (or referred to as $NCM_{622}$ for short), $LiNi_{0.8}Co_{0.1}Mn_{0.1}O_2$ (or referred to as $NCM_{811}$ for short), a lithium nickel cobalt aluminum oxide (such as $LiNi_{0.85}Co_{0.15}Al_{0.05}O_2$), their modified compounds, and the like. Examples of the lithium-containing phosphate of the olivine structure may include, but are not limited to, at least one of lithium iron phosphate (such as $LiFePO_4$ (or referred to as LFP for short)), a composite of lithium iron phosphate and carbon, lithium manganese phosphate (such as $LiMnPO_4$), a composite of lithium manganese phosphate and carbon, lithium manganese iron phosphate, and a composite of lithium manganese iron phosphate and carbon.

In some embodiments, the positive film layer further optionally includes a binder. As an example, the binder may include at least one of a polyvinylidene fluoride (PVDF), a polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer and fluorine-containing acrylate resin.

In some embodiments, the positive film layer further optionally includes a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode sheet may be prepared by the following means: dispersing the foregoing components for preparing a positive electrode sheet, such as the positive active material, the conductive agent, the binder and any other components, in a solvent (such as N-methylpyrrolidone) to form a positive electrode slurry; and coating the positive electrode slurry on a positive electrode current collector, and obtaining the positive electrode sheet after processes of drying, cold pressing, and the like.

[Negative Electrode Sheet]

A negative electrode sheet includes a negative electrode current collector and a negative film layer provided on at least one surface of the negative electrode current collector, and the negative film layer includes a negative active material.

As an example, the negative electrode current collector has two surfaces opposite in its own thickness direction, and the negative film layer is provided on either or both of the two opposite surfaces of the negative electrode current collector.

In some embodiments, the negative electrode current collector may be metal foil or a composite current collector. For example, as the metal foil, copper foil may be used. The composite current collector may include a polymer material base layer and a metal layer formed on at least one surface of the polymer material substrate. The composite current collector may be formed by synthesizing a metal material (copper, copper alloy, nickel, nickel alloy, titanium, titanium alloy, silver, silver alloy, or the like) on the polymer material substrate (such as a substrate of polypropylene (PP), polyethylene glycol terephthalate (PET), polybutylene terephthalate (PBT), polystyrene (PS), polyethylene (PE), or the like).

In some embodiments, the negative active material may be a negative active material for a battery well-known known in the art. As an example, the negative active material may include at least one of the following materials: artificial graphite, natural graphite, soft carbon, hard carbon, silicon-based material, tin-based material, lithium titanate, and the like. The silicon-based material may be selected from at least one of elemental silicon, a silicon-oxygen compound, a silicon-carbon composite, a silicon-nitrogen composite and a silicon alloy. The tin-based material can be selected from at least one of elemental tin, a tin-oxygen compound and a tin alloy. However, the present application is not limited to these materials, and other conventional materials that may be used as the negative active material of the battery may also be used. These negative active materials may be used alone, or two or more types may be used in combination.

In some embodiments, the negative film layer further optionally includes a binder. The binder may be selected from at least one of styrene-butadiene rubber (SBR), polyacrylic acid (PAA), polyacrylate sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative film layer further optionally includes a conductive agent. The conductive agent may be selected from at least one of superconducting carbon, acetylene black, carbon black, Ketjen black, carbon dots, carbon nanotubes, graphene, and carbon nanofibers.

In some embodiments, the negative film layer further optionally includes another additive, such as a thickener (for example, sodium carboxymethyl cellulose (CMC-Na)).

In some embodiments, the negative electrode sheet may be prepared by the following means: dispersing the foregoing components for preparing a negative electrode sheet, such as the negative active material, the conductive agent, the binder and any other components, in a solvent (such as deionized water) to form a negative electrode slurry; and coating the negative electrode slurry on a negative electrode current collector, and obtaining the negative electrode sheet after processes of drying, cold pressing, and the like.

[Electrolyte]

An electrolyte plays the role of conducting ions between a positive electrode sheet and a negative electrode sheet. The type of the electrolyte is not specifically limited in the present application, and can be selected according to needs. For example, the electrolyte may be liquid, gel or all solid.

In some embodiments, the electrolyte is an electrolytic solution. The electrolytic solution includes an electrolyte salt and a solvent.

In some embodiments, the electrolyte salt may be selected from at least one of lithium hexafluorophosphate, lithium tetrafluoroborate, lithium perchlorate, lithium hexafluorarsenate, lithium bisfluorosulfonimide, lithium bistrifluoromethanesulfonimidate, lithium trifluoromethanesulfonate, lithium difluorophosphate, lithium difluorooxalateborate, lithium bisoxalateborate, lithium difluorobisoxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone and diethyl sulfone.

In some embodiments, the electrolytic solution further optionally includes an additive. For example, the additive may include a negative electrode film-forming additive, or a positive electrode film-forming additive, or may further include an additive that can improve specific performance of the battery, such as, an additive for improving overcharge performance of the battery, or an additive for improving high-temperature performance or low-temperature performance of the battery.

In some embodiments, the positive electrode sheet, the negative electrode sheet and the separator may be subject to a winding process or a lamination process, to obtain an electrode assembly.

In some embodiments, the secondary battery may include an outer package. The outer package may be used to package the foregoing electrode assembly and electrolyte.

In some embodiments, the outer package of the secondary battery may be a hard shell such as a hard plastic shell, an aluminum shell, or a steel shell. The outer package of the secondary battery may be a soft package, such as a soft bag. A material of the soft package may be plastic, for example, polypropylene, polybutylene terephthalate, polybutylene succinate.

Figure 5:
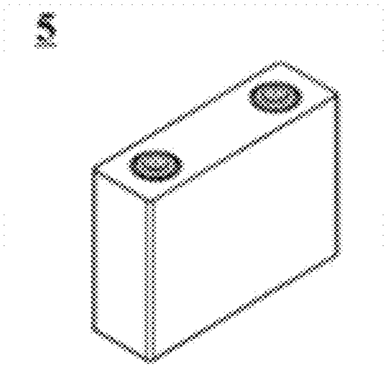
FIG. 5 is a schematic diagram of a secondary battery according to an embodiment of the present application.

The present application has no particular limitation on the shape of the secondary battery, which may be cylindrical, square, or in any other shape. For example, FIG. 5 is a secondary battery 5 in a square structure as an example.

Figure 6:
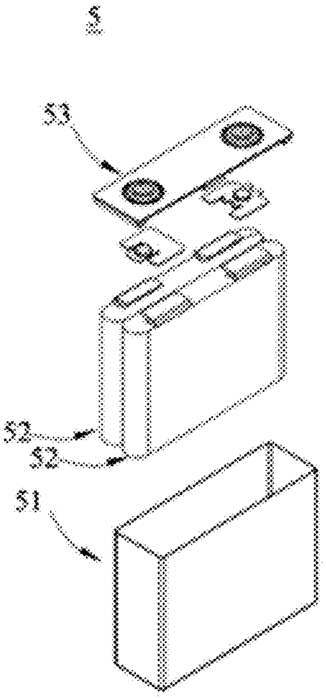
FIG. 6 is an exploded view of the secondary battery according to the embodiment of the present application shown in FIG. 5.

In some embodiments, with reference to FIG. 6, the outer package may include a housing 51 and a cover plate 53. The housing 51 may include a bottom plate and side plates connected to the bottom plate. The bottom plate and the side plates are enclosed to form an accommodating cavity. The housing 51 has an opening that is in communication with the accommodating cavity, and the cover plate 53 can cover the opening to close the accommodating cavity. A positive electrode sheet, a negative electrode sheet, and a separator may be subject to a winding process or a lamination process to form an electrode assembly 52. The electrode assembly 52 is packaged in the accommodating cavity. The electrolytic solution is infiltrated in the electrode assembly 52. The number of electrode assemblies 52 included in the secondary battery may be one or more, which can be selected by persons skilled in the art according to specific actual needs.

In some embodiments, secondary batteries may be assembled into a battery module, the number of secondary batteries included in the battery module may be one or more, and the specific number may be selected by persons skilled in the art according to application and capacity of the battery module.

Figure 7:
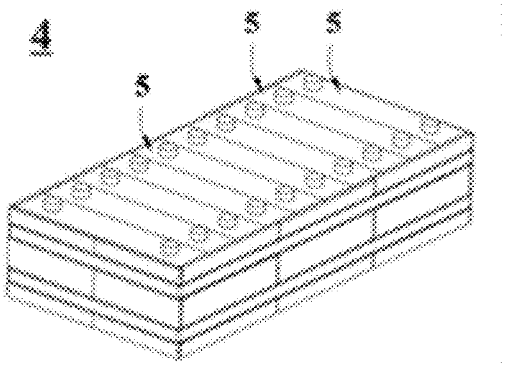
FIG. 7 is a schematic diagram of a battery module according to an embodiment of the present application.

FIG. 7 is a battery module 4 as an example. With reference to FIG. 7, in the battery module 4, a plurality of secondary batteries 5 may be sequentially arranged along a length direction of the battery module 4. Certainly, they may be arranged in any other manner. Further, the plurality of secondary batteries 5 may be fixed with fasteners.

Optionally, the battery module 4 may further include a shell with an accommodating space, and the plurality of secondary batteries 5 are accommodated in the accommodating space.

In some embodiments, the foregoing battery modules may be further assembled into a battery pack, and the number of battery modules included in the battery pack may be one or more, and the specific number may be selected by persons skilled in the art according to application and capacity of the battery pack.

Figure 8:
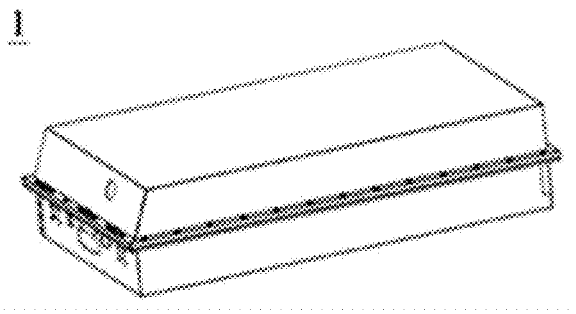
FIG. 8 is a schematic diagram of a battery pack according to an embodiment of the present application.
Figure 9:
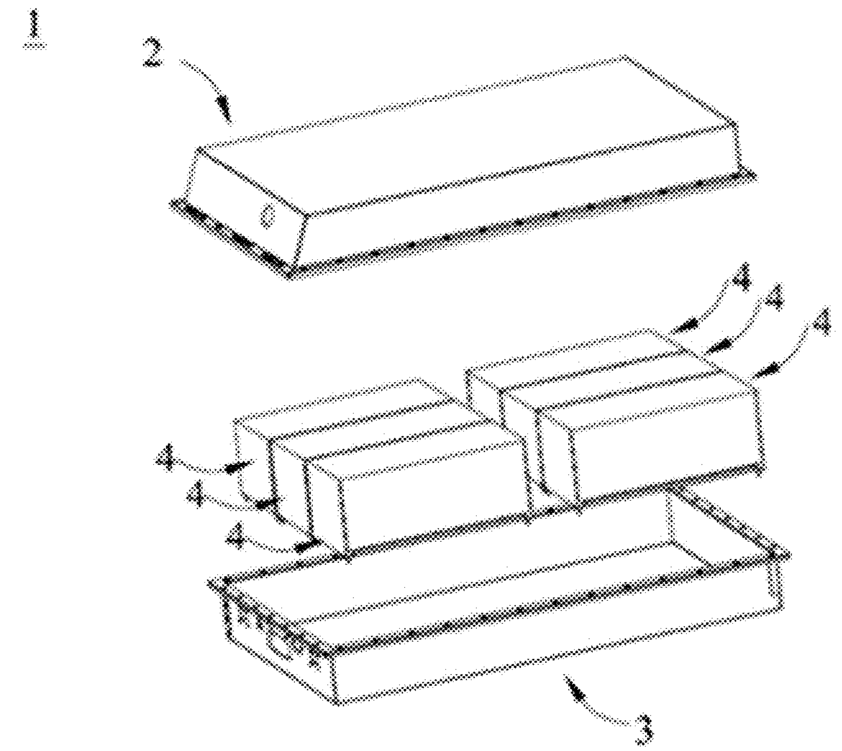
FIG. 9 is an exploded view of the battery pack according to the embodiment of the present application shown in FIG. 8.
Figure 10:
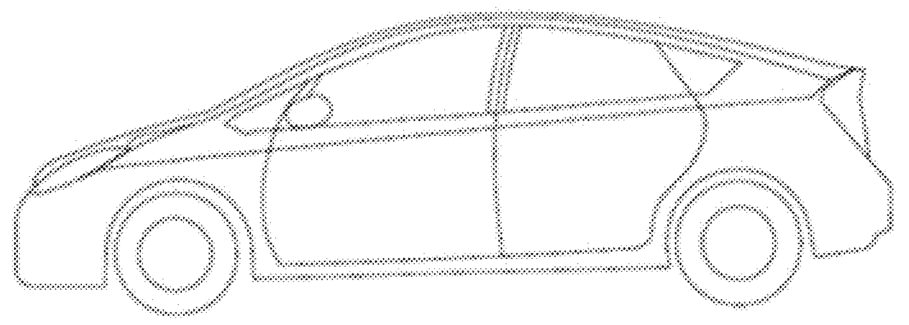
FIG. 10 is a schematic diagram of a power consumption apparatus in which a secondary battery is used as a power source according to an embodiment of the present application.

FIG. 8 and FIG. 9 are a battery pack 1 as an example. With reference to FIG. 9 and FIG. 10, the battery pack 1 may include a battery box and a plurality of battery modules 4 disposed in the battery box. The battery box includes an upper box body 2 and a lower box body 3. The upper box body 2 can cover the lower box body 3 and form an enclosed space for accommodating the battery modules 4. The plurality of battery modules 4 may be arranged in the battery box in any manner.

In addition, the present application further provides a power consumption apparatus including at least one of the secondary battery, the battery module, or the battery pack provided in the present application. The secondary battery, the battery module, or the battery pack can be used as a power source of the power consumption apparatus, or as an energy storage unit of the power consumption apparatus. The power consumption apparatus may include a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf cart, or an electric truck), an electric train, a ship and satellite, an energy storage system, and the like, but is not limited thereto.

As the power consumption apparatus, a secondary battery, a battery module, or a battery pack may be selected according to usage requirements.

FIG. 10 is a power consumption apparatus as an example. The power consumption apparatus is a full electric vehicle, a hybrid electric vehicle, a plug-in hybrid electric vehicle, or the like. To meet a requirement of the power consumption apparatus for high power and high energy density of a secondary battery, a battery pack or a battery module may be used.

In another example, the apparatus may be a mobile phone, a tablet computer, a notebook computer, or the like. The apparatus usually requires lightness and thinness, and a secondary battery may be used as a power source.

EMBODIMENTS

Embodiments of the present application will be described hereinafter. The embodiments described below are exemplary and merely used to explain the present application, and may not be understood as limitation to the present application. Where specific techniques or conditions are not specified in the embodiments, they are performed according to techniques or conditions described in the literature in the art or according to product specifications. The reagents or instruments used without specifying the manufacturer are conventional products that can be obtained from the market.

Materials (1) Substrate: a polyethylene microporous film with a thickness of 9 μm, a pore diameter of 50 nm, and porosity of 38% was used as a substrate.

(2) Inorganic particles: alumina particles with Dv50 of 1.5 μm.

(3) Organic-inorganic hybrid composite compound particles:

(ii) organic-inorganic hybrid composite compound $(CN)_{5.7}[Co_{0.95}Fe]\cdot K_{1.8}$, its preparation method is as follows:

$Fe(II)Cl_2$ (127.10 g) and $K_4Co(II)(CN)_6$ (352.71 g) were weighted and added to deionized water, and they were fully dissolved by stirring, to form a raw material solution with a concentration of 0.1 M. 2 grams of a potassium thiosulfate reducing agent was dissolved in 100 grams of deionized water to form a reducing agent solution, the above reducing agent solution was slowly added to the raw material solution, the pH value of the resulting solution was adjusted to 8.0±0.3 using 0.1M of dilute hydrochloric acid and 0.1M of a KOH solution, this solution was sealed and kept at a temperature of 120° C. for 24 hours, a solid product was recovered by suction and filtration after the reaction, and the solid product was activated at a temperature of 200° C. for 10 hours.

An infrared absorption spectrum test was performed on the solid product, and there was a cyano group signal peak near the wave number of 2065 $cm^{-1}$. ICP analysis was performed to confirm that the proportions of Fe, Co, and K conformed to the above chemical formula. The solid product was subjected to thermogravimetric analysis, and there was no obvious weight loss at a temperature ≤200° C., which indicated that there was no water of crystallization in the solid product. Dv50 of the solid product measured by a Malvern 3000 laser particle size analyzer was 0.4 μm. It was proved that a target product was formed.

Chemical formulas, raw materials, pH values before sealing, infrared absorption spectrum, IPC analysis, thermogravimetric analysis results and average particle sizes of other organic-inorganic hybrid composite compound particles are shown in Table 1.

(4) First organic particles: polyvinylidene fluoride-co-hexafluoropropylene with a weight-average molecular weight of 500000 and Dv50 of 12 μm.

(5) Second organic particles: styrene-butyl acrylate-isooctyl acrylate with Dv50 of 4 μm.

(6) First binder: components of the first binder used in the examples of the present application are shown in Table 2 below. The linear copolymer was obtained by polymerization of various monomers in the presence of a surfactant, and then pH of the system was adjusted by a pH regulator.

As can be seen from Table 2, when the pH regulator was lithium hydroxide, that is, a lithium carboxylate moiety was produced in the linear copolymer, since lithium ions could form stronger ionic bonds, the glass transition temperature (Tg) of the first binder was high, which reflected that such a first binder had good heat resistance.

(7) Second binder: a polyacrylic acid-acrylate-acrylonitrile copolymer, purchased from Sichuan Indigo Technology Co., Ltd.

(8) Stabilizer: sodium carboxymethyl cellulose, purchased from Changshu Wealthy Science and Technology Co., Ltd.

(9) Wetting agent: polyoxyethylene ether, purchased from The Dow Chemical Company.

TABLE 1

| Compound | Raw material of metal cation and molar ratio thereof | pH value before sealing | Infrared absorption spectrum | ICP analysis | Thermogravimetric analysis | Dv50 |
|---|---|---|---|---|---|---|
| $(CN)_6[FeMn]K_2$ | $Mn(II)Cl_2:K_4Fe(II)(CN)_6$ = 1:1 | 8.0 ± 0.3 | There is a cyano group signal peak near the wave number of 2065 $cm^{-1}$ | The proportions of Fe, Mn, and K conform to the chemical formula | No obvious weight loss at a temperature ≤200° C. | 0.5 μm |
| $(CN)_{5.7}[Co_{0.95}Fe]K_{1.8}$ | $Fe(II)Cl_2:K_4Co(II)(CN)_6$ = 1:0.95 | 8.0 ± 0.3 | There is a cyano group signal peak near the wave number of 2065 $cm^{-1}$ | The proportions of Fe, Co, and K conform to the chemical formula | No obvious weight loss at a temperature ≤200° C. | 0.4 μm |
| $(CN)_{5.98}[Fe_{0.99}Mn]Na_{1.99}$ | $Mn(II)Cl_2:Na_4Fe(II)(CN)_6$ = 1:0.99 | 9.5 ± 0.3 | There is a cyano group signal peak near the wave number of 2065 $cm^{-1}$ | The proportions of Fe, Mn, and Na conform to the chemical formula | No obvious weight loss at a temperature ≤200° C. | 0.5 μm |

TABLE 2

| | Linear copolymer | | | | | |
|---|---|---|---|---|---|---|
| No. | Components | molecular weight | Surfactant | Neutralizer | Viscosity mPa · s | Tg ° C. |
| A | a 30% styrene-15% methacrylic acid-10% acrylamide-15% acrylic acid-5% acrylonitrile-10% n-butyl acrylate-2% 2-hydroxyethyl methacrylate-1% E44 epoxy resin (an average epoxy value of 0.44) -12% polyvinyl alcohol (an alcoholysis degree of 88%, a degree of polymerization of 1000) copolymer | $45 \times 10^3$ g/mol | Allyl persulfate | Lithium hydroxide | 240 | 160 |
| B | a 30% styrene-15% methacrylic acid-10% acrylamide-15% acrylic acid-5% acrylonitrile-10% n-butyl acrylate-2% 2-hydroxyethyl methacrylate-1% E44 epoxy resin (an average epoxy value of 0.44) -12% polyvinyl alcohol (an alcoholysis degree of 88%, a degree of polymerization of 1000) copolymer | $45 \times 10^3$ g/mol | Allyl persulfate | Ammonia | 240 | 140 |
| C | a 30% styrene-15% methacrylic acid-10% acrylamide-15% acrylic acid-5% acrylonitrile-10% n-butyl acrylate-2% 2-hydroxyethyl methacrylate-1% E44 epoxy resin (an average epoxy value of 0.44) -12% polyvinyl alcohol (an alcoholysis degree of 88%, a degree of polymerization of 1000) copolymer | $45 \times 10^3$ g/mol | Allyl persulfate | Sodium hydroxide | 240 | 150 |
| D | a 35% styrene-15% methacrylic acid-10% acrylamide-15% acrylic acid-5% acrylonitrile-5% n-butyl acrylate-2% 2-hydroxyethyl methacrylate-1% E44 epoxy resin (an average epoxy value of 0.44) -12% polyvinyl alcohol (an alcoholysis degree of 88%, a degree of polymerization of 1000) copolymer | $45 \times 10^3$ g/mol | Allyl persulfate | Lithium hydroxide | 240 | 170 |
| E | a 30% styrene-15% methacrylic acid-10% acrylamide-15% acrylic acid-5% acrylonitrile-10% n-butyl acrylate-3% 2-hydroxyethyl methacrylate-12% polyvinyl alcohol (an alcoholysis degree of 88%, a degree of polymerization of 1000) copolymer | $45 \times 10^3$ g/mol | Allyl persulfate | Lithium hydroxide | 240 | 165 |
| F | a 30% styrene-15% methacrylic acid-15% acrylamide-15% acrylic acid-5% acrylonitrile-5% n-butyl acrylate-2% 2-hydroxyethyl methacrylate-1% E44 epoxy resin (an average epoxy value of 0.44) -12% polyvinyl alcohol (an alcoholysis degree of 88%, a degree of polymerization of 1000) copolymer | $45 \times 10^3$ g/mol | Allyl persulfate | Lithium hydroxide | 240 | 190 |
| G | a 40% styrene-15% acrylamide-15% acrylic acid-10% n-butyl acrylate-5% n-hexyl methacrylate-2% 2-hydroxyethyl methacrylate-1% E44 epoxy resin (an average epoxy value of 0.44) -12% polyvinyl alcohol (an alcoholysis degree of 88%, a degree of polymerization of 1000) copolymer | $45 \times 10^3$ g/mol | Allyl persulfate | Lithium hydroxide | 240 | 170 |
| H | a 35% styrene-15% methacrylic acid-10% acrylamide-15% acrylic acid-5% acrylonitrile-5% n-butyl acrylate-2% divinylbenzene-1% E44 epoxy resin (an average epoxy value of 0.44) -12% polyvinyl alcohol (an alcoholysis degree of 88%, a degree of polymerization of 1000) copolymer | $45 \times 10^3$ g/mol | Allyl persulfate | Lithium hydroxide | 240 | 170 |

Method

1. Preparation of Separator (1) Inorganic particles, organic-inorganic hybrid composite compound particles, first organic particles, second organic particles, a first binder, a second binder, a stabilizer, and a wetting agent were added to deionized water in a certain mass ratio, so that a solid content was 40%, and a coating slurry was obtained by mixing and stirring them evenly; and (2) the above coating slurry was coated on two surfaces of a substrate by gravure coating, the surface density of each coated surface was 2.5 g/m$^2$, the line number of a gravure roller of a coating machine was 125 LPI, the speed for coating was 50 m/min, the line speed ratio for the coating was 1.15, the speed for drying was 50° C., the time for drying was 25 s, and after drying, a coated separator was obtained.

2. Production of Secondary Battery (1) An active substance $LiNi_{1/3}Mn_{1/3}Co_{1/3}O_2$, a conductive agent of acetylene black, a binder of polyvinylidene fluoride (PVDF) were fully stirred and evenly mixed in N-methylpyrrolidone in a weight ratio of 94:3:3, a positive electrode slurry (with a solid content of 78%) was obtained, the slurry was coated on aluminum foil with a loading capacity of 0.32 g/1540.25 $mm^2$ (density of 3.45 g/cm 3), and a positive electrode sheet was obtained after drying and cold pressing.

(2) An active substance of artificial graphite, a conductive agent of acetylene black, and a binder of styrene-butadiene rubber (SBR) and a thickener of sodium carboxymethyl cellulose (CMC) were fully stirred and evenly mixed in deionized water in a weight ratio of 95:2:2:1, a negative electrode slurry (with a solid content of 50%) was obtained, the slurry was coated on copper foil with a loading capacity of 0.18 g/1540.25 $mm^2$ (density of 1.65 g/cm 3), and a negative electrode sheet was obtained after drying and cold pressing.

(3) The separator prepared in each example and comparative example of the present application was used as a separator for a battery cell.

(4) The positive electrode sheet, the separator, and the negative electrode sheet were stacked in order, so that the separator was in the middle of the cathode and anode as a means of isolation, and they were subjected to winding to obtain a bare cell. The bare cell was placed in an outer package, an electrolytic solution (the electrolytic solution was a solution with a concentration of $LiPF_6$ of 1 mol/L, that is obtained by dissolving $LiPF_6$ in a mixed solvent with a volume ratio of EC:EMC:DEC of 3:5:2) was injected, the outer packaged was packaged to obtain a secondary battery.

3. Scanning Electron Microscopy Test

The test was performed using a ZEISS Sigma 300 scanning electron microscope.

The ion-polished cross-sectional profile (CP) was tested according to the following steps: first, a separator to be tested was cut into a sample to be tested of 6 mm×6 mm, and the sample to be tested was clamped with two pieces of conductive and thermally conductive copper foil, the sample to be tested was bonded and fixed with the copper foil by a double-sided tape, it was pressed by a certain 400 g flat iron block for 1 hour to make the gap between the sample to be tested and the copper foil as small as possible, then the edges were cut evenly with scissors, it was adhered to a sample stage with a conductive adhesive, and the sample only needed to protrude slightly from the edge of the sample stage. Then, the sample stage was put into a sample rack, locked and fixed, a power of an IB-19500CP argon ion cross-section polisher was turned on to perform evacuation to 10 Pa-4 Pa, an flow rate of argon air was set to 0.15 MPa, the voltage to 8 KV, and the polishing time to 2 hours, the sample stage was adjusted to be in a swing mode and start polishing, and after polishing, an ion-polished cross-sectional profile (CP) picture of the sample to be tested was obtained using the ZEISS Sigma 300 scanning electron microscope.

4. Evaluation of Heat Resistance of Coating Film

The heat resistance test was performed on the separators of Examples 1-8 and Comparative Examples C1-5. 5 parallel samples of the separator were taken from each group, and the thermal shrinkage of the separator in the transverse direction (MD) and longitudinal direction (TD) was tested respectively. The test process was as follows: first, the separator was cut into samples with a length of 100 mm and a width of 50 mm in the transverse direction (MD) and longitudinal direction (TD) respectively (where the length direction was in the transverse direction, and the width direction was in the longitudinal direction), then placed at 150° C. for 1 hour, and then the change in size before and after the placement was recorded to calculate the thermal shrinkage.

5. Evaluation Method of Absorption Performance of Electrolytic Solution of Separator The absorption rate test of the electrolytic solution was performed on the separator in each comparative example and example of the present application, and the test method was as follows:

first, a separator to be tested was cut into strip samples with a length of 100 mm and a width of 0.5 mm in the transverse direction (MD) and longitudinal direction (TD) respectively (where the length direction was in the transverse direction, and the width direction was in the longitudinal direction). 5 parallel samples were taken for the separator of each example or comparative example. Two sides of the sample placed horizontally and having a coated side facing upwards were fixed in the width direction with tapes respectively, so that the part of the sample that is between the tapes was suspended (two ends of the separator with a length of 100 mm were respectively covered by the tapes by 5 mm, that is, the suspended length of the sample is 90 mm). Then, at 25° C., 0.5 ml of an electrolytic solution (the electrolytic solution was a solution with a concentration of $LiPF_6$ of 1 mol/L, that is obtained by dissolving $LiPF_6$ in a mixed solvent with a mass ratio of EC/EMC/DEC of 5:3:2) was dropped on the center of the coated side of the sample using a needle tubing with a needle of 0.5 mm, and after standing for 60 s, the diffusion distance of the electrolytic solution on the separator sample was recorded with a scale (the diffusion distance was the infiltration area of the electrolytic solution. The values measured for the above 5 parallel samples were averaged.

6. Evaluation Method of Resistance (R) Performance of Separator

The resistance performance test was performed on the separator in each comparative example and example of the present application, and the test process was as follows:

(1) separator preparation: each separator to be tested was cut into samples with the same size (45.3 mm*33.7 mm), and the samples were placed in an environment at 60° C. for baking for at least 4 hours, and then they were quickly transferred into a Class 100 clean glove box at 25° C. for standby;

(2) symmetrical battery confinement aluminum-plastic bag (purchased from Showa Corporation, Japan) preparation: a blank symmetrical battery was assembled with copper foil to copper foil as a current collector (the blank symmetrical battery assembled with copper foil to copper foil as a current collector was copper foil to copper foil). The confinement of the aluminum-plastic bag was realized by punching holes in the middle of the green tape. The aluminum-plastic bag should be baked in an environment at 60° C. for at least 4 hours before use, and then quickly transferred into the glove box as described in the above (1);

(3) assembling of symmetrical batteries: an anode electrode sheet is used as an electrode, 5 groups of symmetrical battery samples respectively having different numbers of layers of the separator (1, 2, 3, 4, 5) were assembled in situ in the glove box as described in the above (1), each group of samples had 5 parallel samples; the side of the aluminum-plastic bag was sealed using a simple sealing machine, liquid (300 μL) was injected with a pipette, and the bottom was sealed;

(4) Clamping of assembled symmetrical battery: the assembled symmetrical battery was placed in the glove box as described the above (1) overnight, so that the electrolytic solution could fully infiltrate the separator; the next day, the metal clamp was provided, and the pressure of the clamp was controlled at 0.7 MPa;

(5) measurement of electrochemical impedance spectroscopy (EIS):

before the measurement, the symmetrical batteries having different numbers of layers of the separator were placed in a high and low temperature box at a constant temperature of 25° C. for half an hour, and the EIS at 25° C. (if it was at low temperature (i.e., 0° C. to −25° C.), the time at the constant temperature could be extended accordingly, such as about two hours) was measured; and the French Bio-Logic VMP3 electrochemical workstation was adopted, with a voltage less than 5 V, a current less than 400 mA, and current precision of 0.1%*100 μA.

During the measurement, the measurement conditions for the EIS were set to a voltage frequency of 1 MHz-1 kHz, and a disturbance voltage of 5 Mv, and the pressure of the clamp was controlled at 0.7 MPa.

Examples of the data processing method are as follows:

the data processing method will be described hereinafter by an example of a separators with different numbers of layers (the substrate is polyethylene with a thickness of 12 microns and porosity of 40%).

(1) EIS Raw Data Processing:

for the exported Excel data of the measured EIS, the real part Z'(a) was multiplied by 1000 to get the Re column as the abscissa, and the imaginary part Z"(b) was multiplied by −1000 to get the −Im column as the ordinate, so that the unit of the impedance was converted from ohm to mohm; a scatterplot of the real part of the EIS data versus the negative imaginary part was drawn, and the data of each parallel sample of each sample group was drawn on the same graph (as shown in FIG. 2), as a comparison of EIS raw data.

2. Drawing

The real part Re was taken as the x-axis, and the negative imaginary part −Im as the γ-axis, as shown in FIG. 2.

(2) Extraction of Resistance Values of Electrolytic Solution in Separator.

Figure 3:
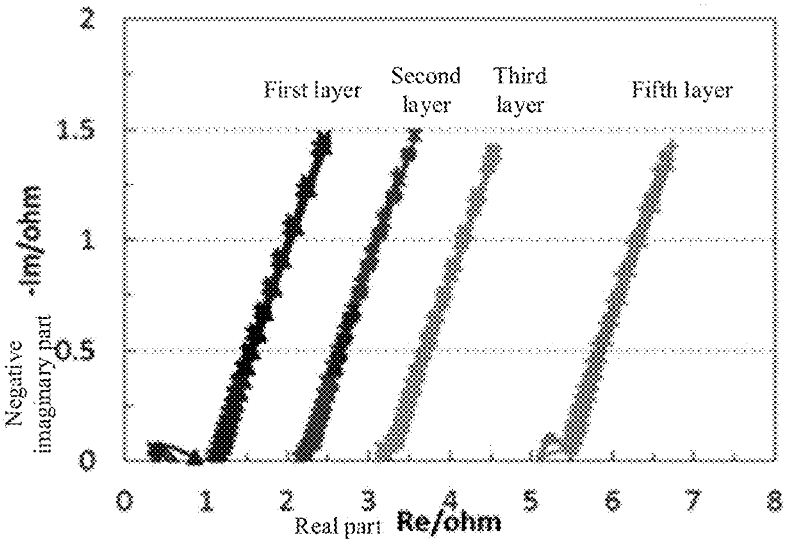
FIG. 3 shows a scatterplot of a real part of EIS data versus a negative imaginary part.
Figure 4:
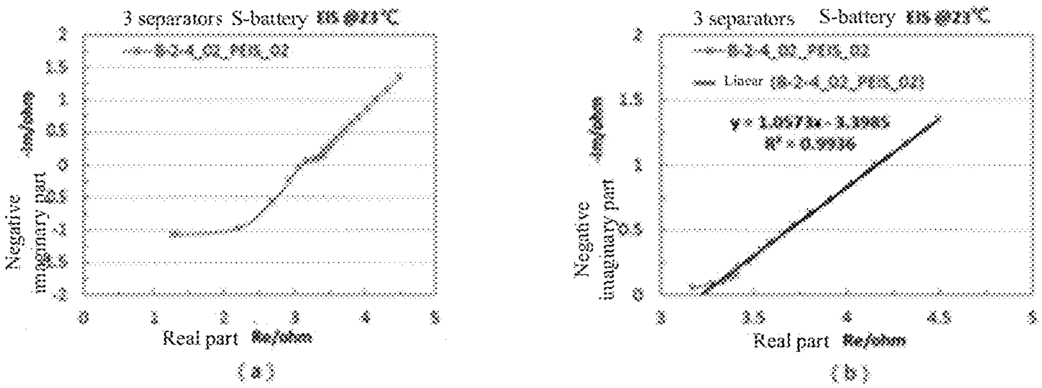
FIG. 4 shows EIS diagrams of extracted resistance values of an electrolytic solution in a separator.

In an example of EIS data of a sample group with three layers of a separator, the extraction method is shown in FIG. 3. In FIG. 3, (a) is an EIS diagram of one of the parallel samples. The points that were not in the first quadrant in the EIS diagram were removed to make a new EIS diagram, as shown in (b).

Then, linear fitting was performed on the scatter points in the first quadrant to obtain the correlation formula y=1.0573x−3.3985, let y=0, x=3.214 could be obtained, which was the required resistance value of the electrolytic solution in the separator; and in a similar fashion, the R value between parallel samples with different numbers of layers can be obtained by performing linear fitting on the measured EIS data.

7. Viscosity Test Method

The Viscosity test was performed using a DV-2TLV Brookfield viscometer according to GB/T 10247-2008.

8. Specific Surface Area Test Method

The test was performed using a Anton Paar specific surface and pore diameter analyzer (Model QDS SI-MP) according to the following method:

the mass m0 of the empty long-necked sample tube was weight, 1 g of organic-inorganic hybrid composite compound particular material was taken and placed in the bulb of the sample tube, the total amount of the sample should not exceed ⅔ of the volume of the bulb, the long neck tube that the sample was attached inside was brushed and cleaned, and was vacuum degassed at 200° C. for 3 hours to remove moisture and impurities, and the mass m1 of the sample tube was weighed again, and the mass of the empty sample tube was deducted to obtain the mass m1−m0 of the dried sample. A glass filling rod was added to the sample tube to reduce the dead volume, nitrogen adsorption was carried out under the negative pressure of the liquid nitrogen bath, and the specific surface area was calculated according to the nitrogen adsorption amount and the mass of the sample.

Test parameters: the range of P/PO was 0.05~0.30, 6 points were evenly distributed, the balance time was 120 s, and the cut-off time was 300 s.

9. Weight-Average Molecular Weight Test Method

The weight-average molecular weight (Mw) of the binder compound obtained in each example was measured using HLC-8320GPC gel permeation chromatography from Tosoh Corporation, Japan (SuperMultiporeHZ series semi-micro SEC column, standard product was polystyrene).

Test method: 2 mg of polymer powder to be tested was dissolved in 2 mL of a GPC-specific DMF solvent, then 2.5 μL of the sample was injected for testing.

Parameter:

pump rate of flow: 5 mL/min;

filling volume: 100 μL;

temperature control range: 60° C.; and data collection frequency: 100 Hz.

10. Performance Evaluation Method of Full Battery 10.1 Cycle Performance Test 5 parallel samples for each group of a lithium-ion secondary battery prepared from the separator in each comparative example and example of the present application were used, and the charging and discharging of the battery were repeated through the following steps respectively, and the capacity retention rate in cycling of the lithium-ion battery was calculated:

in an environment at 25° C., the lithium-ion secondary battery was charged and discharged for the first time, and the specific steps were: it was charged at a constant voltage and a constant charging current of 0.7 C (that is, the current value at which the theoretical capacity is completely released within 2 hours) until the upper limit voltage was 4.4 V, then, it was discharged at a constant discharge current of 0.5 C until the final voltage is 3 V, and the discharge capacity in the first cycle was recorded; and then, charging and discharging cycles were performed for 1000 times in this way, and the discharge capacity in the $1000^{th}$ cycle was recorded.

The capacity retention rate in cycling=(discharge capacity in the $1000^{th}$ cycle/discharge capacity in the first cycle)×100%.

Finally, the average value of the discharge capacity retention rate for 5 parallel samples was calculated, and recorded in the table below.

10.2 Shallow Puncturing Test

At 25° C., a lithium-ion secondary battery prepared from the separator in each example and comparative example of the present application (5 for each example and comparative example) was taken, it was charged to a charge cut-off voltage of 4.2 V at a constant current rate of 1 C, and then charged to a current ≤0.05 C at a constant voltage of 4.2 V, standing for 10 minutes; the larger surface of the battery was peeled off and clamped with a clamp, and then punctured with a steel needle of 1 mm at a speed of 0.1 mm/s until the thermal runway occurred in the battery, and the puncturing depth at this time was denoted as L0;

another same battery was taken, the above operation steps were repeated, and the difference was that the puncturing depth was controlled at L0-0.1 mm, and the observation at rest was for 1 hour;

if the thermal runaway occurred in the battery during the above observation, another battery was taken, the above operation steps were repeated, and the difference was that the puncturing depth was controlled at L0-0.2 mm; and in a similar fashion, until the battery did not experience thermal runaway during the observation, the puncturing depth at this time was denoted as L, and L was the puncturing depth for the safe use of the battery.

Examples 1-46 and Comparative Examples C1-5

The separator and the secondary battery were respectively prepared according to the methods described above. In the preparation of the separator, the weight ratio of each raw material is shown in Table 3 below. The first organic particles were all secondary particles, and the second organic particles were all primary particles. Moreover, Table 3 also shows the test data of the separator and the secondary battery. In addition, $k=\min\{R_{O1}, R_{O2}\}-\max\{R_I, R_{OI}\}$ is defined, and the value k determined according to the method described above is also shown in Table 3.

TABLE 3

Test results of Examples 1-46 and Comparative Examples C1-5

| | Separator | | | | | |
|---|---|---|---|---|---|---|
| | | Organic-inorganic hybrid composite compound particles | | | First binder | First organic particles |
| No. | Weight ratio of each component* | composition | Dv50 μm | BET $m^2/g$ | linear copolymer | Dv50 μm |
| 1 | 29:45:15:5:3:2:0.5:0.5 | $(CN)_6[FeMn]K_2$ | 0.008 | 60 | D | 12 |
| 2 | 29:45:15:5:3:2:0.5:0.5 | $(CN)_6[FeMn]K_2$ | 0.01 | 50 | D | 12 |
| 3 | 29:45:15:5:3:2:0.5:0.5 | $(CN)_6[FeMn]K_2$ | 0.1 | 28 | D | 12 |
| 4 | 29:45:15:5:3:2:0.5:0.5 | $(CN)_6[FeMn]K_2$ | 0.5 | 12 | D | 12 |
| 5 | 29:45:15:5:3:2:0.5:0.5 | $(CN)_6[FeMn]K_2$ | 2 | 4.5 | D | 12 |
| 6 | 29:45:15:5:3:2:0.5:0.5 | $(CN)_6[FeMn]K_2$ | 3 | 1.9 | D | 12 |
| 7 | 29:45:15:5:3:2:0.5:0.5 | $(CN)_6[FeMn]K_2$ | 3.8 | 1.2 | D | 12 |
| 8 | 29:45:15:5:3:2:0.5:0.5 | $(CN)_6[FeMn]K_2$ | 9.5 | 0.8 | D | 12 |
| 9 | 29:45:15:5:3:2:0.5:0.5 | $(CN)_6[FeMn]K_2$ | 0.5 | 12 | D | 4.5 |
| 10 | 29:45:15:5:3:2:0.5:0.5 | $(CN)_6[FeMn]K_2$ | 0.5 | 12 | D | 5 |
| 11 | 29:45:15:5:3:2:0.5:0.5 | $(CN)_6[FeMn]K_2$ | 0.5 | 12 | D | 8 |
| 12 | 29:45:15:5:3:2:0.5:0.5 | $(CN)_6[FeMn]K_2$ | 0.5 | 12 | D | 18 |
| 13 | 29:45:15:5:3:2:0.5:0.5 | $(CN)_6[FeMn]K_2$ | 0.5 | 12 | D | 25 |
| 14 | 29:45:15:5:3:2:0.5:0.5 | $(CN)_6[FeMn]K_2$ | 0.5 | 12 | D | 30 |
| 15 | 29:45:15:5:3:2:0.5:0.5 | $(CN)_6[FeMn]K_2$ | 0.5 | 12 | D | 31 |
| 16 | 29:45:15:5:3:2:0.5:0.5 | $(CN)_6[FeMn]K_2$ | 0.5 | 12 | D | 12 |
| 17 | 29:45:15:5:3:2:0.5:0.5 | $(CN)_6[FeMn]K_2$ | 0.5 | 12 | D | 12 |
| 18 | 29:45:15:5:3:2:0.5:0.5 | $(CN)_6[FeMn]K_2$ | 0.5 | 12 | D | 12 |
| 19 | 29:45:15:5:3:2:0.5:0.5 | $(CN)_6[FeMn]K_2$ | 0.5 | 12 | D | 12 |
| 20 | 29:45:15:5:3:2:0.5:0.5 | $(CN)_6[FeMn]K_2$ | 0.5 | 12 | D | 12 |
| 21 | 29:45:15:5:3:2:0.5:0.5 | $(CN)_6[FeMn]K_2$ | 0.5 | 12 | D | 12 |
| 22 | 29:45:15:5:3:2:0.5:0.5 | $(CN)_{5.7}[Co_{0.95}Fe]K_{1.8}$ | 0.5 | 12 | D | 12 |
| 23 | 29:45:15:5:3:2:0.5:0.5 | $(CN)_{5.98}[Fe_{0.99}Mn]Na_{1.99}$ | 0.5 | 12 | D | 12 |
| 24 | 29:45:15:5:3:2:0.5:0.5 | $(CN)_6[FeMn]K_2$ | 0.5 | 12 | A | 12 |
| 25 | 29:45:15:5:3:2:0.5:0.5 | $(CN)_6[FeMn]K_2$ | 0.5 | 12 | B | 12 |
| 26 | 29:45:15:5:3:2:0.5:0.5 | $(CN)_6[FeMn]K_2$ | 0.5 | 12 | C | 12 |
| 27 | 29:45:15:5:3:2:0.5:0.5 | $(CN)_6[FeMn]K_2$ | 0.5 | 12 | E | 12 |
| 28 | 29:45:15:5:3:2:0.5:0.5 | $(CN)_6[FeMn]K_2$ | 0.5 | 12 | F | 12 |
| 29 | 29:45:15:5:3:2:0.5:0.5 | $(CN)_6[FeMn]K_2$ | 0.5 | 12 | G | 12 |
| 30 | 29:45:15:5:3:2:0.5:0.5 | $(CN)_6[FeMn]K_2$ | 0.5 | 12 | H | 12 |
| 31 | 0:74:15:5:3:2:0.5:0.5 | $(CN)_6[FeMn]K_2$ | 0.5 | 12 | D | 12 |
| 32 | 10:64:15:5:3:2:0.5:0.5 | $(CN)_6[FeMn]K_2$ | 0.5 | 12 | D | 12 |
| 33 | 35:39:15:5:3:2:0.5:0.5 | $(CN)_6[FeMn]K_2$ | 0.5 | 12 | D | 12 |
| 34 | 38:36:15:5:3:2:0.5:0.5 | $(CN)_6[FeMn]K_2$ | 0.5 | 12 | D | 12 |
| 35 | 44:30:15:5:3:2:0.5:0.5 | $(CN)_6[FeMn]K_2$ | 0.5 | 12 | D | 12 |
| 36 | 49:25:15:5:3:2:0.5:0.5 | $(CN)_6[FeMn]K_2$ | 0.5 | 12 | D | 12 |
| 37 | 25:49:15:5:3:2:0.5:0.5 | $(CN)_6[FeMn]K_2$ | 0.5 | 12 | D | 12 |
| 38 | 30:45:15:5:2:2:0.5:0.5 | $(CN)_6[FeMn]K_2$ | 0.5 | 12 | D | 12 |
| 39 | 29.5:45:15:5:2.5:2:0.5:0.5 | $(CN)_6[FeMn]K_2$ | 0.5 | 12 | D | 12 |
| 40 | 30.5:45:15:5:1.5:2:0.5:0.5 | $(CN)_6[FeMn]K_2$ | 0.5 | 12 | D | 12 |
| 41 | 24:45:15:5:8:2:0.5:0.5 | $(CN)_6[FeMn]K_2$ | 0.5 | 12 | D | 12 |
| 42 | 22:45:15:5:10:2:0.5:0.5 | $(CN)_6[FeMn]K_2$ | 0.5 | 12 | D | 12 |
| 43 | 23:36:26:9:3:2:0.5:0.5 | $(CN)_6[FeMn]K_2$ | 0.5 | 12 | D | 12 |
| 44 | 23:40:23:8:3:2:0.5:0.5 | $(CN)_6[FeMn]K_2$ | 0.5 | 12 | D | 12 |
| 45 | 29:49:12:4:3:2:0.5:0.5 | $(CN)_6[FeMn]K_2$ | 0.5 | 12 | D | 12 |
| 46 | 32:49:10:3:3:2:0.5:0.5 | $(CN)_6[FeMn]K_2$ | 0.5 | 12 | D | 12 |
| C1 | 74:0:15:5:3:2:0.5:0.5 | — | — | — | D | 12 |
| C2 | 29:48:15:5:0:2:0.5:0.5 | $(CN)_6[FeMn]K_2$ | 0.5 | 12 | — | 12 |
| C3 | 30:49:0:15:3:2:0.5:0.5 | $(CN)_6[FeMn]K_2$ | 0.5 | 12 | D | — |

TABLE 3-continued

Test results of Examples 1-46 and Comparative Examples C1-5

| | | | | | | |
|---|---|---|---|---|---|---|
| C4 | 29:45:20:0:3:2:0.5:0.5 | $(CN)_6[FeMn]K_2$ | 0.5 | 12 | D | 12 |
| C5 | 96:0:0:0:3:0:0.5:0.5 | — | — | — | — | — |

| | Separator | | | | | | Secondary battery | | |
|---|---|---|---|---|---|---|---|---|---|
| | Second organic particles | | 150° C./1 h thermal shrink | | Liquid absorption length of electrolytic solution | | Capacity retention rate | | Puncturing |
| No. | Dv50 µm | K | MD % | TD % | mm | Resistance Ω | @25° C. % | @45° C. % | depth mm |
| 1 | 4 | 2.5 | 10 | 15 | 40 | 1.09 | 79 | 70 | 5.01 |
| 2 | 4 | 2.5 | 3 | 4 | 55 | 0.91 | 85 | 84 | 9 |
| 3 | 4 | 2.5 | 2.1 | 2.8 | 57 | 0.89 | 87 | 85 | 9.1 |
| 4 | 4 | 2.5 | 1.5 | 1 | 60 | 0.85 | 90 | 89 | 9.5 |
| 5 | 4 | 2 | 2.3 | 5 | 56 | 0.9 | 86 | 85 | 9.05 |
| 6 | 4 | 1 | 3.9 | 5 | 53 | 1.02 | 82 | 82 | 8.95 |
| 7 | 4 | 0.2 | 15 | 17 | 38 | 1.19 | 75 | 74 | 5.59 |
| 8 | 4 | −5.5 | 21 | 20 | 35 | 1.25 | 70 | 69 | 5.34 |
| 9 | 4 | 2.5 | 12 | 13 | 40 | 1.2 | 76 | 72 | 5.95 |
| 10 | 4 | 2.5 | 7 | 8 | 54 | 1 | 82 | 82 | 8.98 |
| 11 | 4 | 2.5 | 5 | 6 | 55 | 0.87 | 88 | 88 | 9.4 |
| 12 | 4 | 2.5 | 4 | 3 | 56 | 0.92 | 85 | 84 | 9.0 |
| 13 | 4 | 2.5 | 5 | 4 | 55 | 0.94 | 84 | 84 | 8.83 |
| 14 | 4 | 2.5 | 9 | 8 | 52 | 0.96 | 84 | 84 | 8.7 |
| 15 | 4 | 2.5 | 20 | 19 | 42 | 1.23 | 67 | 65 | 5.34 |
| 16 | 1.6 | 0.1 | 11 | 11 | 42 | 1.32 | 70 | 65 | 5.02 |
| 17 | 2 | 0.5 | 6 | 7 | 54 | 1 | 84 | 83 | 8.98 |
| 18 | 3.2 | 1.7 | 2 | 1.8 | 58 | 0.87 | 88 | 88 | 9.23 |
| 19 | 8.5 | 7 | 5 | 4 | 58 | 0.86 | 89 | 88 | 9.2 |
| 20 | 11.5 | 10 | 7 | 8 | 55 | 0.9 | 86 | 85 | 8.8 |
| 21 | 12 | 10.5 | 18 | 17 | 40 | 1.16 | 70 | 68 | 4.89 |
| 22 | 4 | 2.5 | 1.6 | 1.2 | 58 | 0.87 | 89 | 88 | 9.45 |
| 23 | 4 | 2.5 | 1.4 | 1 | 59 | 0.86 | 89 | 89 | 9.42 |
| 24 | 4 | 2.5 | 2.5 | 2 | 58 | 0.95 | 87 | 86 | 9 |
| 25 | 4 | 2.5 | 6 | 7 | 57 | 0.91 | 85 | 84 | 8.65 |
| 26 | 4 | 2.5 | 5 | 4 | 58 | 0.9 | 86 | 87 | 8.76 |
| 27 | 4 | 2.5 | 3 | 2.8 | 60 | 0.87 | 88 | 87 | 9 |
| 28 | 4 | 2.5 | 1 | 0.8 | 62 | 0.88 | 87 | 87 | 9.36 |
| 29 | 4 | 2.5 | 1.8 | 1 | 58 | 0.87 | 88 | 87 | 9.25 |
| 30 | 4 | 2.5 | 2 | 1.7 | 58 | 0.9 | 86 | 85 | 9.05 |
| 31 | 4 | 2.5 | 1.5 | 1.4 | 56 | 1.04 | 84 | 82 | 8.85 |
| 32 | 4 | 2.5 | 2.5 | 2.0 | 55 | 0.97 | 85 | 84 | 8.91 |
| 33 | 4 | 2.5 | 5.5 | 5.0 | 54 | 0.96 | 86 | 85 | 8.12 |
| 34 | 4 | 2.5 | 6 | 5 | 52 | 1.10 | 83 | 82 | 8.10 |
| 35 | 4 | 2.5 | 6.5 | 5.5 | 52 | 1.12 | 81 | 80 | 8.0 |
| 36 | 4 | 2.5 | 9 | 8 | 48 | 1.26 | 76 | 75 | 7.5 |
| 37 | 4 | 2.5 | 4.5 | 4 | 55 | 1.0 | 82 | 81 | 8.7 |
| 38 | 4 | 2.5 | 5.0 | 5.0 | 53 | 0.99 | 82 | 81 | 8.52 |
| 39 | 4 | 2.5 | 4.5 | 4.0 | 52 | 0.95 | 82 | 80 | 8.72 |
| 40 | 4 | 2.5 | 13 | 12 | 52 | 0.95 | 81 | 80 | 7.0 |
| 41 | 4 | 2.5 | 1 | 0.5 | 60 | 1.20 | 80 | 80 | 9.5 |
| 42 | 4 | 2.5 | 1 | 0.5 | 60 | 1.23 | 69 | 69 | 9.43 |
| 43 | 4 | 2.5 | 20 | 18 | 45 | 1.29 | 72 | 70 | 5.1 |
| 44 | 4 | 2.5 | 7 | 8 | 56 | 0.92 | 86 | 85 | 9.12 |
| 45 | 4 | 2.5 | 1 | 0.8 | 59 | 0.88 | 88 | 87 | 9.32 |
| 46 | 4 | 2.5 | 1 | 0.5 | 55 | 0.92 | 79 | 75 | 9.2 |
| C1 | 4 | — | 38 | 34 | 35 | 1.51 | 66 | 65 | 3.3 |
| C2 | 4 | — | 40 | 35 | 25 | 1.53 | 63 | 62 | 3 |
| C3 | 4 | — | 21 | 20 | 42 | 1.42 | 68 | 66 | 3.95 |
| C4 | — | — | 25 | 18 | 44 | 1.32 | 69 | 62 | 3.4 |
| C5 | — | — | 45 | 40 | 20 | 1.59 | 60 | 60 | 3.1 |

*Examples 1-46 are: inorganic particles: organic-inorganic hybrid composite compound particles: first organic particles: second organic particles: first binder: second binder: stabilizer: wetting agent Comparative Example C1 is: inorganic particles: first organic particles: second organic particles: first binder: second binder: stabilizer: wetting agent (that is, without organic-inorganic hybrid composite compound particles)

Comparative Example C2 is: inorganic particles: organic-inorganic hybrid composite compound particles: first organic particles: second organic particles: second binder: stabilizer: wetting agent (that is, without first binder)

Comparative Example C3 is: inorganic particles: organic-inorganic hybrid composite compound particles: second organic particles: first binder: second binder: stabilizer: wetting agent (that is, without first organic particles)

Comparative Example C4 is: inorganic particles: organic-inorganic hybrid composite compound particles: first organic particles: first binder: second binder: stabilizer: wetting agent (that is, without second organic particles)

Comparative Example C5 is: inorganic particles: second binder compound: stabilizer: wetting agent (that is, without organic-inorganic hybrid composite compound particles, first organic particles, second organic particles and first binder)

According to the above results, it can be seen that, compared with the comparative examples, various examples of the present disclosure have better thermal shrinkage inhibition, a longer liquid absorption length, lower resistance, an improved capacity retention rate and a larger penetration depth. This shows that the separator of the present application has good safety performance and cycle performance (25° C. and 45° C.).

It can be seen from Examples 1-8 and 22-30 that, when Dv50 of the organic-inorganic hybrid composite compound particles was in the range of 0.01 μm to 3 μm and/or the specific surface area was in the range of 1 $m^2/g$ to 50 $m^2/g$, the separator of the present application had good heat resistance and a longer liquid absorption length, and the secondary battery including the separator had good cycle performance and safety performance.

It can be seen from Examples 9-15 that, when Dv50 of the first organic particles was in the range of 5 μm to 30 μm, the separator of the present application had good heat resistance and a longer liquid absorption length, and the secondary battery including the separator had good cycle performance and safety performance.

It can be seen from Examples 16-21 that, when Dv50 of the second organic particles was in the range of 2 μm to 11.5 μm, the separator of the present application had good comprehensive performance, and the secondary battery including the separator had good cycle performance and safety performance.

It can be seen from Examples 1-21 that, when k was in the range of 0.2-10, the separator of the present application with good comprehensive performance could be obtained.

It can be seen from Examples 31-36 that, when the inorganic particles and the organic-inorganic hybrid composite compound particles were in the range of 0-44 wt % and 30-74 wt % respectively, the separator and secondary battery of the present application with good performance could be obtained.

It can be seen from Examples 37-42 that, when the content of the first binder was in the range of 2 to 8 wt %, the separator of the present application had good heat resistance, and the secondary battery had the cycle performance was safe.

It can be seen from Examples 43-46 that, when the contents of the first organic particles and the second organic particles were all within the scope of the present application and conformed to the ratio range of 1:5 to 1:2, the heat resistance of the separator of the present application was good, and the secondary battery had good cycle performance and was safe.

In addition, it can be seen from Comparative Example C2 that, the separator without the first binder shrinks thermally at 150° C., while the example added with the first binder had smaller thermal shrinkage.

It should be noted that the present application is not limited to the foregoing embodiments. The foregoing embodiments are merely examples, and embodiments having substantially the same constitution as the technical idea and exerting the same effects within the technical solution of the present application are all included within the technical scope of the present application. In addition, various modifications may be made to the embodiments by persons skilled in the art without departing from the spirit and scope of the present application, and other embodiments that are constructed by combining some of the constituent elements of the embodiments are also included in the scope of the present application.

What is claimed is:

1. A separator, comprising:

a substrate, and a coating provided on at least one surface of the substrate, the coating comprising inorganic particles, first organic particles, second organic particles, organic-inorganic hybrid composite compound particles, and a first binder;

wherein:

the first organic particles and the second organic particles are embedded between the inorganic particles and the organic-inorganic hybrid composite compound particles and form bulges on a surface of the coating;

the first organic particles and the second organic particles each are independently one or more polymers containing one or more groups selected from: halogen, a phenyl group, an epoxy group, a cyano group, an ester group, an amide group, a hydroxyl group, a carboxyl group, a sulfonyl ester group, and a pyrrolidone group;

the first binder comprises one or more linear copolymers containing a hydroxyl group and a carboxylate moiety;

the organic-inorganic hybrid composite compound contains metal atoms and/or metal cations, and organic ligands, and basic units constituting the organic-inorganic hybrid composite compound are periodically assembled in at least one spatial direction;

Dv50 of the first organic particles is in a range of 5 μm to 30 μm, Dv50 of the second organic particles is in a range of 2 μm to 11.5 μm, and the Dv50 of the first organic particles is larger than the Dv50 of the second organic particles;

the first organic particles are all secondary particles and the second organic particles are all primary particles; and the organic-inorganic hybrid composite compound is $(CN)_6$ $[FeMn]K_2$, $(CN)_{5.7}$ $[Co_{0.95}Fe]K_{1.8}$, or $(CN)_{5.98}$ $[Fe_{0.99}Mn]Na_{1.99}$.

2. The separator according to claim 1, wherein number-average particle sizes of the inorganic particles, the first organic particles, the second organic particles and the organic-inorganic hybrid composite compound particles are respectively defined as $R_I$, $R_{O1}$, $R_{O2}$ and $R_{O-I}$, which satisfy $$0.2\,\mu m \leq \min\{R_{O1}, R_{O2}\} - \max\{R_I, R_{O-I}\} \leq 10\,\mu m.$$

3. The separator according to claim 1, wherein

Dv50 of the first organic particles is 8 μm to 18 μm; and/or

Dv50 of the second organic particles is 3 μm to 11.5 μm; and/or

Dv50 of the organic-inorganic hybrid composite compound particles is 0.01 μm to 3 μm.

4. The separator according to claim 1, wherein the first organic particles are particles of a homopolymer or copolymer containing one or more substituent groups selected from halogen, a phenyl group, an epoxy group, a cyano group, an ester group, and an amide group; and/or the second organic particles are particles of a homopolymer or copolymer containing one or more substituent groups selected from a phenyl group, an epoxy group, a cyano group, an ester group, a hydroxyl group, a carboxyl group, a sulfonyl ester group, and a pyrrolidone group.

5. The separator according to claim 1, wherein a specific surface area of the organic-inorganic hybrid composite compound particles is 1 $m^2/g$ to 50 $m^2/g$.

6. The separator according to claim 1, wherein the one or more linear copolymers is a polymerization product containing the following types of monomer:

(1) a first type of monomer, the first type of monomer is selected from at least one of: acrylic acid, methacrylic acid, methyl methacrylate, tert-butyl methacrylate, isobornyl methacrylate, methylolacrylamide, acrylamide, styrene, and acrylonitrile;

(2) a second type of monomer, the second type of monomer is selected from at least one of: ethyl acrylate, n-butyl acrylate, isobutyl acrylate, tert-butyl acrylate, 2-ethylhexyl acrylate, n-octyl acrylate, decyl acrylate, cyclohexyl acrylate, ethyl methacrylate, n-butyl methacrylate, isobutyl methacrylate, 2-ethylhexyl methacrylate, lauryl methacrylate, n-hexyl methacrylate, tridecyl methacrylate, octadecyl methacrylate, cyclohexyl methacrylate, benzyl methacrylate, ethyleneurea ethyl methacrylate, dicyclopentene ethoxy methacrylate, tetrahydrofuryl methacrylate, trifluoroethyl methacrylate, ethyleneurea ethyl methacrylate, propylene methacrylate, dicyclopentene ethoxy methacrylate, tetrahydrofuryl methacrylate, and trifluoroethyl methacrylate;

(3) a third type of monomer, the third type of monomer is selected from at least one of: 2-hydroxyethyl acrylate, 2-hydroxypropyl acrylate, 2-hydroxyethyl methacrylate, 2-hydroxypropyl methacrylate, glycidyl acrylate, glycidyl methacrylate, dimethylaminoethyl methacrylate, diethylaminoethyl methacrylate, vinyltrimethoxysilane, vinyltriethoxysilane, vinyltriisopropoxysilane, γ-methacryloxypropyltrimethoxysilane, N-methylolacrylamide, N-butoxymethyl (methyl) acrylamide, diacetone acrylamide (DAAM), acetoacetoxy ethyl methacrylate (AAEM), divinylbenzene, and epoxy resin with an epoxy value of 0.35~0.50; and (4) a fourth type of monomer, the fourth type of monomer is selected from at least one of: polyvinyl alcohol, polypropylene alcohol, polypropylene glycol, polyethylene glycol, and polyvinyl acid alcohol.

7. The separator according to claim 6, wherein after polymerizing the first type of monomer, the second type of monomer, the third type of monomer and the fourth type of monomer, a pH regulator is added to adjust pH to 5-7, and the pH regulator is selected from at least one of: lithium hydroxide, calcium hydroxide, sodium hydroxide and ammonia water.

8. The separator according to claim 6, wherein the first type of monomer accounts for 60 wt % to 85 wt %; and/or the second type of monomer accounts for 1 wt % to 10 wt %; and/or the third type of monomer accounts for 1 wt % to 10 wt %; and/or the fourth type of monomer accounts for 1 wt % to 20 wt %, calculated based on a total weight of all monomers contained in the one or more linear copolymers.

9. The separator according to claim 1, wherein the one or more linear copolymers is a polymer selected from:

A. a 30% styrene-15% methacrylic acid-10% acrylamide-15% acrylic acid-5% acrylonitrile-10% n-butyl acrylate-2% 2-hydroxyethyl methacrylate-1% E44 epoxy resin-12% polyvinyl alcohol copolymer having a Tg of 160° C.;

B. a 30% styrene-15% methacrylic acid-10% acrylamide-15% acrylic acid-5% acrylonitrile-10% n-butyl acrylate-2% 2-hydroxyethyl methacrylate-1% E44 epoxy resin-12% polyvinyl alcohol copolymer having a Tg of 140° C.;

C. a 30% styrene-15% methacrylic acid-10% acrylamide-15% acrylic acid-5% acrylonitrile-10% n-butyl acrylate-2% 2-hydroxyethyl methacrylate-1% E44 epoxy resin-12% polyvinyl alcohol copolymer having a Tg of 150° C.;

D. a 35% styrene-15% methacrylic acid-10% acrylamide-15% acrylic acid-5% acrylonitrile-5% n-butyl acrylate-2% 2-hydroxyethyl methacrylate-1% E44 epoxy resin-12% polyvinyl alcohol copolymer;

E. a 30% styrene-15% methacrylic acid-10% acrylamide-15% acrylic acid-5% acrylonitrile-10% n-butyl acrylate-3% 2-hydroxyethyl methacrylate-12% polyvinyl alcohol copolymer;

F. a 30% styrene-15% methacrylic acid-15% acrylamide-15% acrylic acid-5% acrylonitrile-5% n-butyl acrylate-2% 2-hydroxyethyl methacrylate-1% E44 epoxy resin-12% polyvinyl alcohol copolymer;

G. a 40% styrene-15% acrylamide-15% acrylic acid-10% n-butyl acrylate-5% n-hexyl methacrylate-2% 2-hydroxyethyl methacrylate-1% E44 epoxy resin-12% polyvinyl alcohol copolymer; and H. a 35% styrene-15% methacrylic acid-10% acrylamide-15% acrylic acid-5% acrylonitrile-5% n-butyl acrylate-2% divinylbenzene-1% E44 epoxy resin-12% polyvinyl alcohol copolymer;

wherein an average epoxy value of the E44 epoxy resin is 0.44, an alcoholysis degree of the polyvinyl alcohol is 88% and a degree of polymerization of the polyvinyl alcohol is 1000, and the percentage is a weight percentage of a monomer, calculated based on a total weight of all monomers.

10. The separator according to claim 1, wherein a weight-average molecular weight of the one or more linear copolymers is $1\times10^3$ g/mol to $200\times10^3$ g/mol.

11. The separator according to claim 1, wherein the first organic particles are at least one selected from: a homopolymer or copolymer of fluorine-containing alkenyl monomer units, a homopolymer or copolymer of olefin monomer units, a homopolymer or copolymer of unsaturated nitrile monomer units, a homopolymer or copolymer of alkylene oxide monomer units, a bipolymer, homopolymer or copolymer of monosaccharide monomer units, and modified compounds of the above homopolymers or copolymers.

12. The separator according to claim 1, wherein the second organic particles are at least one selected from: a homopolymer or copolymer of acrylate monomer units, a homopolymer or copolymer of acrylic acid monomer units, a homopolymer or copolymer of unsaturated nitrile monomer units, a homopolymer or copolymer of ethylenic monomer units, a homopolymer or copolymer of styrene monomer units, a homopolymer or copolymer of epoxy monomer units, a polyurethane compound, a rubber compound, a bipolymer, homopolymer or copolymer of monosaccharide monomer units, and modified compounds of the above homopolymers or copolymers.

13. The separator according to claim 1, wherein, calculated based on a total weight of the coating, a content of the inorganic particles is 10 wt % to 44 wt %; and/or a content of the organic-inorganic hybrid composite compound particles is 30 wt % to 74 wt %; and/or a content of the first binder is 2 wt % to 8 wt %; and/or a total content of the first organic particles and the second organic particles is 16 wt % to 31 wt %.

14. The separator according to claim 1, wherein a weight ratio of the first organic particles to the second organic particles is 1:2 to 6:1.

15. The separator according to claim 1, wherein viscosity of the first binder is 150 mPa·s-400 mPa·s.

16. The separator according to claim 1, wherein a ratio of a total weight of the first organic particles and the second organic particles to a total weight of the inorganic particles and the organic-inorganic hybrid composite compound particles is 1:5 to 1:2.

17. A secondary battery, comprising the separator according to claim 1.

18. A power consumption apparatus, comprising the secondary battery according to claim 17.

* * * * *